(12) United States Patent
Asano et al.

(10) Patent No.: US 12,054,647 B2
(45) Date of Patent: Aug. 6, 2024

(54) ADHESIVE LAYER, ADHESIVE COMPOSITION, SOLVENT-FREE ADHESIVE COMPOSITION, ADHESIVE AGENT, AND ADHESIVE SHEET

(71) Applicant: Mitsubishi Chemical Corporation, Tokyo (JP)

(72) Inventors: Tetsuya Asano, Tokyo (JP); Kazuki Nohara, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 17/237,645

(22) Filed: Apr. 22, 2021

(65) Prior Publication Data
US 2021/0238458 A1    Aug. 5, 2021

Related U.S. Application Data

(63) Continuation of application No. PCT/JP2019/043197, filed on Nov. 5, 2019.

(30) Foreign Application Priority Data

Nov. 6, 2018  (JP) ................................ 2018-208985
Nov. 6, 2018  (JP) ................................ 2018-208986

(51) Int. Cl.
| | | |
|---|---|---|
| *C09J 133/08* | (2006.01) | |
| *B32B 7/12* | (2006.01) | |
| *B32B 15/08* | (2006.01) | |
| *B32B 15/20* | (2006.01) | |
| *B32B 17/10* | (2006.01) | |
| *B32B 27/28* | (2006.01) | |
| *B32B 27/36* | (2006.01) | |
| *C09J 7/25* | (2018.01) | |
| *C09J 7/38* | (2018.01) | |

(52) U.S. Cl.
CPC ............... *C09J 133/08* (2013.01); *B32B 7/12* (2013.01); *B32B 15/08* (2013.01); *B32B 15/20* (2013.01); *B32B 17/10* (2013.01); *B32B 27/281* (2013.01); *B32B 27/36* (2013.01); *C09J 7/255* (2018.01); *C09J 7/385* (2018.01); *B32B 2307/412* (2013.01); *B32B 2307/54* (2013.01); *C09J 2433/00* (2013.01); *C09J 2467/006* (2013.01)

(58) Field of Classification Search
CPC . C09J 7/385; C09J 4/06; C09J 2433/00; C09J 133/08
See application file for complete search history.

(56) References Cited

U.S. PATENT DOCUMENTS

| | | | |
|---|---|---|---|
| 2007/0148444 A1 | 6/2007 | Kamiya et al. | |
| 2012/0316294 A1* | 12/2012 | Ogawa | C09J 133/08 525/450 |
| 2013/0005910 A1 | 1/2013 | Okamoto et al. | |
| 2014/0322440 A1 | 10/2014 | Nonaka et al. | |
| 2016/0289517 A1* | 10/2016 | Shin | C08F 265/06 |
| 2020/0239749 A1 | 7/2020 | Asano et al. | |

FOREIGN PATENT DOCUMENTS

| | | | | |
|---|---|---|---|---|
| CN | 1986716 | | 6/2007 | |
| CN | 103849332 | | 6/2014 | |
| JP | 2007-177003 | A | 7/2007 | |
| JP | 4067173 | B2 | 3/2008 | |
| JP | 2008-248223 | A | 10/2008 | |
| JP | 2014-108968 | A | 6/2014 | |
| JP | 2014-214280 | A | 11/2014 | |
| JP | 2016-188310 | A | 11/2016 | |
| JP | 2016188310 | A * | 11/2016 | |
| TW | 201504387 | A | 2/2015 | |
| WO | 2011/118183 | A1 | 9/2011 | |
| WO | 2014/192827 | A1 | 12/2014 | |
| WO | WO-2014192827 | A1 * | 12/2014 | ......... C08G 18/6229 |
| WO | 2016/117045 | A1 | 7/2016 | |
| WO | 2019/123892 | A1 | 6/2019 | |

OTHER PUBLICATIONS

ISR issued in Application No. PCT/JP2019/043197, Dec. 24, 2019, English translation.
IPRP issued in Application No. PCT/JP2019/043197, May 11, 2021, English translation.
Chinese Office Action issued in Application No. 01980071036.X, dated Apr. 19, 2022, with English translation.
Office Action issued in CN Patent Application No. 01980071036.X, dated Nov. 9, 2022, translation.
Office Action issued in TW Patent Application No. 108139993, Jan. 7, 2023, translation.
Office Action issued in JP Patent Application No. 2019-200400, May 30, 2023, translation.
Office Action issued in JP Patent Application No. 2019-200401, Jun. 6, 2023, translation.
Reasons for Refusal issued in CN Patent Application No. 201980071036. X, Apr. 1, 2023, translation.
Notification of Decision of Refusal issued in TW Patent Application No. 108139993, Jun. 5, 2023, translation.
Office Action issued in Korean Patent Application No. 10-2021-7012753, Dec. 7, 2023, translation.

\* cited by examiner

*Primary Examiner* — Alicia J Weydemeyer

(74) *Attorney, Agent, or Firm* — GREENBLUM & BERNSTEIN, P.L.C.

(57) ABSTRACT

An adhesive layer is formed by curing an adhesive composition [I] containing an acrylic resin (X), and has an adhesive strength ($\alpha$) of not less than 25 N/25 mm, a bending durability ($\beta$) of not less than 100,000 times, and a moist heat haze resistance ($\gamma$) of not greater than 1.0% as measured under predetermined conditions. The adhesive layer has excellent adhesive strength to adherends, excellent bending durability, and excellent moist heat haze resistance.

15 Claims, No Drawings

ADHESIVE LAYER, ADHESIVE COMPOSITION, SOLVENT-FREE ADHESIVE COMPOSITION, ADHESIVE AGENT, AND ADHESIVE SHEET

RELATED APPLICATION

This application is a continuation of International Application No. PCT/JP2019/043197, filed on Nov. 5, 2019, which claims priority to Japanese Patent Application No. 2018-208985 and 2018-208986, filed on Nov. 6, 2018, the entire contents of each of which being hereby incorporated by reference.

TECHNICAL FIELD

The present disclosure relates to an adhesive layer, an adhesive composition, a solvent-free adhesive composition, an adhesive agent, and an adhesive sheet. More specifically, the present disclosure relates to an adhesive layer, an adhesive composition, a solvent-free adhesive composition, an adhesive agent, and an adhesive sheet, which each have higher adhesive strength to adherends, and yet are excellent in bending durability and haze suppressing property in a moist heat environment (hereinafter often referred to as "moist heat haze resistance").

BACKGROUND ART

In recent years, a protection layer such as of plastic sheet is generally provided on a viewing side of a display for TV, PC monitor, laptop PC, cellular phone, tablet terminal, wearable terminal, and other mobile devices, and a space (air layer) is provided between the display and the protection layer for prevention of damage to the display due to external impact.

However, reflection is liable to occur in an interface between the protection layer and the air layer and in an interface between the air layer and the display, thereby problematically deteriorating the viewability of the display.

In recent years, an impact-absorbing adhesive layer is used in place of the air layer in order to improve the viewability and reduce the thickness of the mobile device (plastic sheet) while ensuring the impact resistance.

The adhesive layer is required to have a sufficient thickness for sufficient impact-absorbing property. Where a commonly available conventional solvent-containing acrylic adhesive agent is used as a coating liquid for thicker coating application, the coating liquid is liable to drip during the application of the coating liquid for formation of the thicker adhesive layer, and is liable to suffer from difficulty in evaporation of the solvent in the drying step after the application of the coating liquid. This problematically results in foaming of the adhesive layer.

On the other hand, it is proposed to use solvent-free adhesive agents such as hot melt adhesive agent and active energy radiation-curable adhesive agent (e.g., PTL 1).

Of the solvent-free adhesive agents, the hot melt adhesive agent ensures efficient formation of the adhesive layer in a short period of time, even if being applied to a greater thickness, without the need for the drying step of evaporating the solvent after the application of the coating liquid.

RELATED ART DOCUMENT

Patent Document

PTL 1: JP-A-2014-214280

SUMMARY

From the viewpoint of the higher functionality, the multifunctionality, and the design diversification of the mobile devices in recent years, a flat panel display for the mobile devices is required to have curvature and flexibility. To satisfy the requirement, there is a demand for an adhesive agent for preventing a substrate of the display from being broken even if the display is bent, and for preventing the substrate of the display from being cracked even if the display is repeatedly bent.

In the art disclosed in PTL 1, however, no consideration is given to the bending durability and, therefore, an improved adhesive composition is demanded.

A conceivable approach to the improvement of the bending durability is to provide an adhesive agent having a lower elastic modulus. However, the adhesive agent having a lower elastic modulus is liable to be poorer in adhesive strength and moist heat haze resistance. Therefore, further improvement is required to impart the adhesive agent with excellent bending durability, excellent adhesive strength, and excellent moist heat haze resistance in a properly balanced manner.

In view of the foregoing, the present disclosure provides an adhesive layer which has higher adhesive strength to adherends and yet are excellent in bending durability and moist heat haze resistance, and provides an adhesive composition and a solvent-free adhesive composition for formation of the adhesive layer, an adhesive agent, and an adhesive sheet.

The inventors conducted intensive studies in view of the foregoing. As a result, the inventors found that an adhesive layer formed by curing an acrylic resin-containing adhesive composition and having an adhesive strength of not less than 25 N/25 mm, a bending durability of not less than 100,000 times, and a moist heat haze resistance of not higher than 1.0% meets the object of the present disclosure.

Further, the inventors found that, where an acrylic resin contained in the adhesive composition includes at least two acrylic resins having different glass transition temperatures and each respectively having a weight average molecular weight of not less than 10,000, and has a glass transition temperature of not higher than −20° C. as measured as a temperature at which the loss tangent of the dynamic viscoelasticity thereof is maximum, and a difference in glass transition temperature between a highest-glass transition temperature acrylic resin and a lowest-glass transition temperature acrylic resin is not greater than 20° C., the object of the present disclosure is met more.

Further, the inventors found that, where the acrylic resin contained in the adhesive composition contains a hydroxyl-containing monomer including 2-hydroxyethyl (meth)acrylate and 4-hydroxybutyl (meth)acrylate as a copolymerization component and has a lower glass transition temperature, the adhesive composition is excellent in heat stability with a smaller viscosity increase due to heating, and ensures thick coatability if being used as an adhesive agent. Further, the adhesive composition is excellent in adhesive strength to adherends, bending durability, and moist heat haze resistance.

According to a first aspect of the present disclosure, there is provided an adhesive layer which is formed by curing an adhesive composition [I] containing an acrylic resin (X), and has an adhesive strength ($\alpha$) of not less than 25 N/25 mm, a bending durability ($\beta$) of not less than 100,000 times, and a moist heat haze resistance ($\gamma$) of not greater than 1.0% as determined in the following manner:

the adhesive strength (α) being defined as a 180-degree peel strength (N/25 mm) measured at a peel rate of 300 mm/minute by means of an autograph with the use of a sample prepared by forming the adhesive layer on an adhesion-facilitated polyethylene terephthalate sheet (hereinafter often referred to as "PET sheet" and having a thickness of 125 μm) to produce an adhesive sheet, reciprocally moving a 2-kg roller on the adhesive sheet to press-bond the adhesive layer of the adhesive sheet to an alkali-free glass plate in an environment at 23° C. at 50% RH, and allowing the resulting adhesive sheet to stand still in the environment at 23° C. at 50% RH for 30 minutes;

the bending durability (β) being defined as the number of times of bending during which no appearance change is observed when a repetitive bending test is performed, with the use of a test sample prepared by forming the adhesive layer on an adhesion-facilitated PET sheet (having a thickness of 125 μm) to produce an adhesive sheet and reciprocally moving a roller on the adhesive sheet to press-bond the adhesive layer of the adhesive sheet to a transparent polyimide film (having a thickness of 50 μm) in an environment at 23° C. at 50% RH, by repeatedly bending the test sample at a rate of 40 times/minute to a bent state with the PET sheet of the test sample located inward and with opposed sheet portions of the test sample spaced a distance of 5 mm in the environment at 23° C. at 50% RH; and the moist heat haze resistance (γ) being defined as a difference between haze values measured before and after a moist heat test is performed in an environment at 60° C. at 90% RH for seven days (168 hours) with the use of a test piece prepared by forming the adhesive layer on an adhesion-facilitated PET sheet (having a thickness of 125 μm) to produce an adhesive sheet, bonding the adhesive sheet to an alkali-free glass plate (having a thickness of 1.1 mm), and autoclaving the resulting adhesive sheet (at 50° C. at 0.5 MPa for 20 minutes).

According to a second aspect of the present disclosure, there is provided an adhesive composition [I] containing an acrylic resin (X), wherein the acrylic resin (X) includes at least two acrylic resins having different glass transition temperatures and each respectively having a weight average molecular weight of not less than 10,000, wherein the acrylic resin (X) has a glass transition temperature ($T_X$) of not higher than −20° C. as measured as a temperature at which the loss tangent of the dynamic viscoelasticity thereof is maximum, wherein a temperature difference between the glass transition temperature ($T_{X1}$) of a highest-glass transition temperature acrylic resin (X1) and the glass transition temperature ($T_{X2}$) of a lowest-glass transition temperature acrylic resin (X2) is not greater than 20° C.

According to a third aspect of the present disclosure, there is provided an adhesive composition [II] containing an acrylic resin (Y), wherein the acrylic resin (Y) includes an acrylic resin (Y2) prepared by copolymerization using a hydroxyl-containing monomer (a1) including 2-hydroxyethyl (meth)acrylate and 4-hydroxybutyl (meth)acrylate as a copolymerization component, wherein the acrylic resin (Y) has a glass transition temperature (Ty) of not higher than −20° C. as measured as a temperature at which the loss tangent of the dynamic viscoelasticity thereof is maximum.

Further, a fourth aspect of the present disclosure provides a solvent-free adhesive composition prepared from the adhesive composition of the second or third aspect. A fifth aspect of the present disclosure provides an adhesive agent prepared by using the adhesive composition of the second or third aspect, or the solvent-free adhesive composition of the fourth aspect. A sixth aspect of the present disclosure provides an adhesive sheet including an adhesive layer formed by using the adhesive composition of the second or third aspect, or the solvent-free adhesive composition of the fourth aspect.

The adhesive layer according to the present disclosure is an adhesive layer formed by curing the adhesive composition [I] containing the acrylic resin (X), and has an adhesive strength (α) of not less than 25 N/25 mm, a bending durability (β) of not less than 100,000 times, and a moist heat haze resistance (γ) of not greater than 1.0% as determined in the aforementioned manner. Therefore, the adhesive layer has excellent adhesive strength to adherends, and yet is excellent in bending durability and moist heat haze resistance. Hence, the adhesive layer is useful for an adhesive agent and an adhesive sheet, which are used for touch panels and image display devices, particularly for touch panels and image display devices for foldable smartphones.

In the adhesive layer formed by curing the adhesive composition [I] containing the acrylic resin (X), the acrylic resin (X) includes at least two acrylic resins having different glass transition temperatures and each respectively having a weight average molecular weight of not less than 10,000, and has a glass transition temperature ($T_X$) of not higher than −20° C. as measured as a temperature at which the loss tangent of the dynamic viscoelasticity thereof is maximum, and a temperature difference between the glass transition temperature ($T_{X1}$) of a highest-glass transition temperature acrylic resin (X1) and the glass transition temperature ($T_{X2}$) of a lowest-glass transition temperature acrylic resin (X2) is not greater than 20° C. In this case, the adhesive layer has excellent adhesive strength to adherends, and yet is excellent in bending durability and moist heat haze resistance. Therefore, the adhesive layer is useful for an adhesive agent and an adhesive sheet, which are used for touch panels and image display devices, particularly for touch panels and image display devices for foldable smartphones.

In the adhesive composition of the present disclosure, which is the adhesive composition [I] containing the acrylic resin (X), the acrylic resin (X) includes at least two acrylic resins having different glass transition temperatures and each respectively having a weight average molecular weight of not less than 10,000, and has a glass transition temperature ($T_X$) of not higher than −20° C. as measured as a temperature at which the loss tangent of the dynamic viscoelasticity thereof is maximum, and the temperature difference between the glass transition temperature ($T_{X1}$) of the highest-glass transition temperature acrylic resin (X1) and the glass transition temperature ($T_{X2}$) of the lowest-glass transition temperature acrylic resin (X2) is not greater than 20° C. Where the adhesive composition is used for an adhesive agent, therefore, the adhesive agent has excellent adhesive strength to adherends, and yet is excellent in bending durability and moist heat haze resistance. Therefore, the adhesive composition is useful for an adhesive agent and an adhesive sheet, which are used for touch panels and image display devices, particularly for touch panels and image display devices for foldable smartphones.

Where the acrylic resin (X1) has a glass transition temperature ($T_{X1}$) of −25° C. to −10° C. as measured as a temperature at which the loss tangent of the dynamic viscoelasticity thereof is maximum, the adhesive strength and the bending durability are more excellent.

Where the acrylic resin (X2) has a glass transition temperature ($T_{X2}$) of −35° C. to −20° C. as measured as a temperature at which the loss tangent of the dynamic viscoelasticity thereof is maximum, the adhesive strength and the bending durability are still more excellent.

Where the acrylic resin (X1) and the acrylic resin (X2) are present in a weight ratio X1/X2 of 70/30 to 30/70, the adhesive strength and the bending durability are more excellent.

Where the acrylic resin (X2) is an acrylic resin prepared by copolymerization using a hydroxyl-containing monomer (a1) including 2-hydroxyethyl (meth)acrylate and 4-hydroxybutyl (meth)acrylate as a copolymerization component, the adhesive strength and the bending durability are still more excellent.

In the adhesive composition of the present disclosure, which is the adhesive composition [II] containing the acrylic resin (Y), the acrylic resin (Y) includes the acrylic resin (Y2) prepared by the copolymerization using the hydroxyl-containing monomer (a1) including 2-hydroxyethyl (meth)acrylate and 4-hydroxybutyl (meth)acrylate as the copolymerization component, and has a glass transition temperature (Ty) of not higher than −20° C. as measured as a temperature at which the loss tangent of the dynamic viscoelasticity thereof is maximum. Therefore, the adhesive composition is excellent in heat stability with a smaller viscosity increase due to heating, and ensures thick coatability when being used for an adhesive agent. Further, the adhesive composition has excellent adhesive strength to adherends, and yet is excellent in bending durability, particularly repetitive bending durability and reliability in a bent state, and moist heat haze resistance. The adhesive composition is useful for an adhesive agent and an adhesive sheet, which are used for touch panels and image display devices, particularly for touch panels and image display devices for foldable smartphones.

Where the acrylic resin (Y) includes at least two acrylic resins having different glass transition temperatures and a temperature difference between the glass transition temperature ($T_{Y1}$) of a highest-glass transition temperature acrylic resin (Y1) and the glass transition temperature ($T_{Y2}$) of a lowest-glass transition temperature acrylic resin (Y2) as each measured as a temperature at which the loss tangent of the dynamic viscoelasticity thereof is maximum is not greater than 20° C., the adhesive strength and the bending durability are more excellent.

Where the acrylic resin (Y1) has a glass transition temperature ($T_{Y1}$) of −25° C. to −10° C. as measured as a temperature at which the loss tangent of the dynamic viscoelasticity thereof is maximum, the adhesive strength and the bending durability are still more excellent.

Where the acrylic resin (Y2) has a glass transition temperature ($T_{Y2}$) of −35° C. to −20° C. as measured as a temperature at which the loss tangent of the dynamic viscoelasticity thereof is maximum, the adhesive strength and the bending durability are more excellent.

Where the acrylic resin (Y1) and the acrylic resin (Y2) are present in a weight ratio Y1/Y2 of 70/30 to 30/70, the adhesive strength and the bending durability are still more excellent.

Where the acrylic resin (Y1) and the acrylic resin (Y2) each have a weight average molecular weight of not less than 10,000, the bending durability is more excellent.

Where the adhesive composition further contains a carbodiimide compound, the heat resistance is more excellent.

Further, the solvent-free adhesive composition prepared from the adhesive composition can be easily formed into a thicker adhesive layer, and is excellent from an environmental viewpoint.

The adhesive agent prepared by using the adhesive composition or the solvent-free adhesive composition has excellent adhesive strength to adherends, and yet is excellent in bending durability and moist heat haze resistance.

The adhesive sheet including the adhesive layer formed by using the adhesive composition or the solvent-free adhesive composition has excellent adhesive strength to adherends, and yet is excellent in bending durability and moist heat haze resistance.

DESCRIPTION OF EMBODIMENTS

Preferred embodiments of the present disclosure will hereinafter be described in detail by way of example.

In the present disclosure, the term "(meth)acrylic" means acrylic or methacrylic, and the term "(meth)acryloyl" means acryloyl or methacryloyl. Further, the term "(meth)acrylate" means acrylate or methacrylate.

According to the present disclosure, the adhesive composition [I] contains an acrylic resin (X), and the adhesive composition [II] contains an acrylic resin (Y). The acrylic resins (X) and (Y) respectively contained in the adhesive compositions [I] and [II] will hereinafter be described.

<Acrylic Resins>

The acrylic resin (X) preferably has a glass transition temperature of not higher than −20° C.

The acrylic resin (X) may include a single acrylic resin, or may include two or more acrylic resins having different glass transition temperatures. Particularly, the acrylic resin (X) preferably includes two or more acrylic resins having different glass transition temperatures and each respectively having a weight average molecular weight of not less than 10,000 in order to satisfy the requirements for the adhesive strength and the bending durability.

More preferably, the acrylic resin (X) includes at least two acrylic resins having different glass transition temperatures and each respectively having a weight average molecular weight of not less than 10,000, and a temperature difference between the glass transition temperature ($T_{X1}$) of a highest-glass transition temperature acrylic resin (X1) and the glass transition temperature ($T_{X2}$) of a lowest-glass transition temperature acrylic resin (X2) is not greater than 20° C.

The acrylic resin (Y) includes an acrylic resin (Y2), and has a glass transition temperature (Ty) of not higher than −20° C. The acrylic resin (Y2) is a copolymer prepared by copolymerization using hydroxyl-containing monomers including 2-hydroxyethyl (meth)acrylate and 4-hydroxybutyl (meth)acrylate as a copolymerization component.

The acrylic resins to be used in the present disclosure are copolymers each prepared by polymerizing a copolymerization component including a hydroxyl-containing monomer (a1), and preferably further including at least one copolymerizable monomer (a2) selected from the group consisting of a vinyl ester monomer and an alkyl (meth)acrylate monomer having a C5 to C14 alkyl group, at least one copolymerizable monomer (a3) selected from the group consisting of a vinyl ester monomer and an alkyl (meth)acrylate monomer having a C1 to C4 alkyl group (excluding the monomers (a1) and (a2)) and, as required, a functional group-containing ethylenically-unsaturated monomer (a4) (excluding the monomer (a1)), and other copolymerizable monomer (a5) as the copolymerization component.

<Hydroxyl-Containing Monomer (a1)>

Examples of the hydroxyl-containing monomer (a1) include: primary hydroxyl-containing (meth)acrylate monomers including hydroxy(meth)acrylates such as 2-hydroxyethyl (meth)acrylate, 4-hydroxybutyl (meth)acrylate, 5-hydroxypentyl (meth)acrylate, 6-hydroxyhexyl (meth)acrylate, and 8-hydroxyoctyl (meth)acrylate, caprolactone-modified monomers such as caprolactone-modified 2-hydroxyethyl (meth)acrylate, oxyalkylene-modified monomers such as diethylene glycol (meth)acrylate and polyethylene glycol (meth)acrylate, and 2-acryloyloxyethyl-2-hydroxyethyl phthalate; secondary hydroxyl-containing monomers such as 2-hydroxypropyl (meth)acrylate, 2-hydroxybutyl (meth)acrylate, and 3-chloro-2-hydroxypropyl (meth)acrylate; and tertiary hydroxyl-containing monomers such as 2,2-dimethyl-2-hydroxyethyl (meth)acrylate. These may be used alone or in combination.

Of the monomers described above as the hydroxyl-containing monomer (a1), the primary hydroxy-containing monomers, particularly 2-hydroxyethyl (meth)acrylate and 4-hydroxybutyl (meth)acrylate are preferred.

For preparation of the acrylic resin (X2), it is particularly preferred to use the hydroxyl-containing monomer (a1) including 2-hydroxyethyl (meth)acrylate and 4-hydroxybutyl (meth)acrylate as the copolymerization component in order to satisfy the requirements for the adhesive strength and the bending durability. Particularly, the hydroxyl-containing monomer (a1) preferably includes only 2-hydroxyethyl (meth)acrylate and 4-hydroxybutyl (meth)acrylate.

For preparation of the acrylic resin (Y2), it is necessary to use the hydroxyl-containing monomer (a1) including 2-hydroxyethyl (meth)acrylate and 4-hydroxybutyl (meth)acrylate as the copolymerization component in order to ensure excellent bending durability and excellent adhesive strength.

Further, the hydroxyl-containing monomer (a1) for the acrylic resin (Y2) particularly preferably includes only 2-hydroxyethyl (meth)acrylate and 4-hydroxybutyl (meth)acrylate.

In the present disclosure, where 2-hydroxyethyl (meth)acrylate and 4-hydroxybutyl (meth)acrylate are used as the hydroxyl-containing monomer (a1), the copolymerization weight ratio between 2-hydroxyethyl (meth)acrylate and 4-hydroxybutyl (meth)acrylate is preferably 95/5 to 30/70, more preferably 80/20 to 40/60, particularly preferably 75/25 to 45/55, especially preferably 70/30 to 50/50. If the ratio of 2-hydroxyethyl (meth)acrylate is excessively small, an adhesive agent prepared by using the adhesive composition tends to have lower adhesive strength. If the ratio of 2-hydroxyethyl (meth)acrylate is excessively great, the adhesive agent prepared by using the adhesive composition tends to be poorer in bending durability.

The amount of di(meth)acrylates contained as impurities in the hydroxyl-containing monomer (a1) to be used in the present disclosure is preferably as small as possible. Specifically, the amount of the di(meth)acrylates is preferably not greater than 0.5 wt. %, particularly preferably not greater than 0.2 wt. %, more preferably not greater than 0.1 wt. %.

The proportion of the hydroxyl-containing monomer (a1) in the acrylic resin (X) is typically 5 to 60 wt. %, preferably 8 to 45 wt. %, particularly preferably 10 to 40 wt. %, more preferably 11 to 35 wt. %, especially preferably 12 to 30 wt. %, based on the weight of the overall copolymerization component.

The proportion of the hydroxyl-containing monomer (a1) in the acrylic resin (Y) is typically 5 to 60 wt. %, preferably 8 to 45 wt. %, particularly preferably 10 to 35 wt. %, more preferably 11 to 30 wt. %, especially preferably 12 to 25 wt. %, based on the weight of the overall copolymerization component.

If the proportion of the hydroxyl-containing monomer (a1) based on the weight of the overall copolymerization component is excessively small, the adhesive agent prepared by using the adhesive composition tends to have lower moist heat resistance. If the proportion of the hydroxyl-containing monomer (a1) based on the weight of the overall copolymerization component is excessively great, a self-crosslinking reaction of the acrylic resin is liable to occur, thereby reducing the heat resistance.

<Copolymerizable Monomer (a2)>

In the present disclosure, the copolymerization component preferably includes a copolymerizable monomer having a structure that permits easy hydrogen extraction in a high-energy state occurring due to a high temperature or ultraviolet radiation and, as a result, facilitates crosslinking. The copolymerization component particularly preferably includes at least one copolymerizable monomer (a2) selected from the group consisting of a vinyl ester monomer and an alkyl (meth)acrylate monomer having a C5 to C14 alkyl group, and more preferably is an alkyl (meth)acrylate monomer having a branched C5 to C14 alkyl group.

For the preparation of the acrylic resin (X), the copolymerization component particularly preferably includes 2-ethylhexyl (meth)acrylate.

For the preparation of the acrylic resin (Y), the copolymerization component particularly preferably includes 2-ethylhexyl (meth)acrylate and/or isononyl (meth)acrylate.

The proportion of the copolymerizable monomer (a2) is preferably 15 to 90 wt. %, particularly preferably 20 to 85 wt. %, more preferably 30 to 80 wt. %, especially preferably 40 to 75 wt. %, most preferably 45 to 70 wt. %, based on the weight of the overall copolymerization component.

If the proportion of the copolymerizable monomer (a2) is excessively small, the adhesive agent prepared by using the adhesive composition tends to be poorer in step followability and durability. If the proportion of the copolymerizable monomer (a2) is excessively great, the adhesive agent prepared by using the adhesive composition tends to have lower adhesive strength.

<Copolymerizable Monomer (a3)>

In the present disclosure, the copolymerization component preferably includes at least one copolymerizable monomer (a3) selected from the group consisting of a vinyl ester monomer and an alkyl (meth)acrylate monomer having a C1 to C4 alkyl group (excluding the copolymerizable monomers (a1) and (a2)) for improvement of the cohesive force and for improvement of the adhesive strength of the adhesive agent prepared by using the adhesive composition.

Examples of the copolymerizable monomer (a3) include methyl (meth)acrylate, ethyl (meth)acrylate, n-butyl (meth)acrylate, t-butyl (meth)acrylate, isobutyl (meth)acrylate, n-propyl (meth)acrylate, isopropyl (meth)acrylate, vinyl propionate, and vinyl acetate. These monomers may be used alone or in combination as the copolymerizable monomer (a3).

Of the monomers described above as the copolymerizable monomer (a3), methyl (meth)acrylate, ethyl (meth)acrylate, and t-butyl (meth)acrylate are preferred for improvement of the cohesive force of the adhesive agent prepared by using the adhesive composition.

Of the monomers described above as the copolymerizable monomer (a3), at least one (meth)acrylate (a3-1) selected from the group consisting of methyl (meth)acrylate and ethyl (meth)acrylate is preferably used in order to reliably provide the effect of the present disclosure.

The proportion of the copolymerizable monomer (a3) is preferably 5 to 70 wt. %, particularly preferably 10 to 60 wt. %, more preferably 15 to 45 wt. %, based on the weight of the overall copolymerization component. If the proportion of the copolymerizable monomer (a3) is excessively small, the adhesive agent prepared by using the adhesive composition tends to have lower adhesive strength. If the proportion of the copolymerizable monomer (a3) is excessively great and the acrylic resin has a smaller molecular weight, the adhesive agent prepared by using the adhesive composition tends to be poorer in durability.

Where the at least one (meth)acrylate (a3-1) selected from the group consisting of methyl (meth)acrylate and ethyl (meth)acrylate is used as the copolymerizable monomer (a3), the proportion of the (meth)acrylate (a3-1) is preferably 5 to 40 wt. %, particularly preferably 7 to 30 wt. %, more preferably 10 to 25 wt. %, based on the weight of the overall copolymerization component. If the proportion of the (meth) acrylate (a3-1) is excessively great, the handling ease during processing tends to be deteriorated due to increase in viscosity. If the proportion of the (meth)acrylate (a3-1) is excessively small, the adhesive agent prepared by using the adhesive composition tends to have lower adhesive strength.

<Functional Group-Containing Ethylenically-Unsaturated Monomer (a4)>

In the present disclosure, as required, the functional group-containing ethylenically-unsaturated monomer (a4) (excluding the monomer (a1)) may be used as the copolymerization component for the acrylic resin.

Examples of the functional group-containing ethylenically-unsaturated monomer (a4) include monomer containing a nitrogen-containing functional group, acetoacetyl-containing monomer, isocyanate-containing monomer, and glycidyl-containing monomer.

Of these, the monomer containing a nitrogen-containing functional group is preferred in order to impart the adhesive composition with the cohesive force and the crosslinking acceleration effect. Particularly, amino-containing monomer and amide-containing monomer are preferred, and the amino-containing monomer is more preferred.

Examples of the amino-containing monomer include: primary amino-containing (meth)acrylates such as aminomethyl (meth)acrylate and aminoethyl (meth)acrylate; secondary amino-containing (meth)acrylates such as t-butylaminoethyl (meth)acrylate, t-butylaminopropyl (meth)acrylate, and ethylaminoethyl (meth)acrylate; tertiary amino-containing (meth)acrylates such as dimethylaminoethyl (meth)acrylate, diethylaminoethyl (meth)acrylate, dimethylaminopropyl (meth)acrylate, and diethylaminopropyl (meth)acrylate; and dimethylaminopropylacrylamide.

Examples of the amide-containing monomer include: (meth)acrylamide; N-alkyl(meth)acrylamides such as N-methyl(meth)acrylamide, N-ethyl(meth)acrylamide, N-propyl(meth)acrylamide, N-n-butyl(meth)acrylamide, diacetone(meth)acrylamide, and N,N'-methylenebis(meth)acrylamide; N,N-dialkyl(meth)acrylamides such as N,N-dimethyl(meth)acrylamide, N,N-diethyl(meth)acrylamide, N,N-dipropyl(meth)acrylamide, N,N-ethylmethylacrylamide, and N,N-diallyl(meth)acrylamide; hydroxyalkyl(meth)acrylamides such as N-hydroxymethyl (meth)acrylamide, and N-hydroxyethyl (meth)acrylamide; and alkoxyalkyl (meth)acrylamides such as N-methoxymethyl(meth)acrylamide and N-(n-butoxymethyl) (meth)acrylamide.

Examples of the acetoacetyl group-containing monomer include 2-(acetoacetoxy)ethyl (meth)acrylate, and allyl acetoacetate.

Examples of the isocyanate-containing monomer include 2-acryloyloxyethyl isocyanate, 2-methacryloyloxyethyl isocyanate, and alkylene oxide adducts of these isocyanates.

Examples of the glycidyl-containing monomer include glycidyl (meth)acrylate and allylglycidyl (meth)acrylate.

These monomers may be used alone or in combination as the functional group-containing ethylenically-unsaturated monomer (a4).

The proportion of the functional group-containing ethylenically-unsaturated monomer (a4) is preferably not greater than 30 wt. %, particularly preferably not greater than 20 wt. %, more preferably not greater than 10 wt. %, especially preferably not greater than 5 wt. %, based on the weight of the overall copolymerization component. If the proportion of the functional group-containing ethylenically-unsaturated monomer (a4) is excessively great, the resin tends to have lower heat resistance.

<Other Copolymerizable Monomer (a5)>

In the present disclosure, as required, other copolymerizable monomer (a5) may be used as the copolymerization component for the acrylic resin.

Examples of the other copolymerizable monomer (a5) include aromatic (meth)acrylate monomers such as phenyl (meth)acrylate, benzyl (meth)acrylate, phenoxyethyl (meth) acrylate, phenyldiethylene glycol (meth)acrylate, phenoxypolyethylene glycol (meth)acrylate, phenoxypolyethylene glycol-polypropylene glycol (meth)acrylate, and nonylphenol ethylene oxide adduct (meth)acrylates; and acrylonitrile, methacrylonitrile, styrene, α-methylstyrene, vinyl stearate, vinyl chloride, vinylidene chloride, alkyl vinyl ether, vinyltoluene, vinylpyridine, vinylpyrrolidone, dialkyl itaconates, dialkyl fumarates, allyl alcohol, acryl chloride, methyl vinyl ketone, N-acrylamidomethyltrimethylammonium chloride, allyltrimethylammonium chloride, and dimethylallyl vinyl ketone. These may be used alone or in combination.

In order to increase the molecular weight of the acrylic resin, for example, a compound having two or more ethylenically unsaturated groups, such as ethylene glycol di(meth)acrylate, diethylene glycol di(meth)acrylate, triethylene glycol di(meth)acrylate, polyethylene glycol di(meth)acrylate, propylene glycol di(meth)acrylate or divinylbenzene, may be used in a small amount as the copolymerization component. In this case, the compound having two or more ethylenically unsaturated groups is generally highly reactive and, hence, is less liable to be left unreacted when being used as the polymerization component for the acrylic resin. If the use amount is excessively great, however, the compound having two or more ethylenically unsaturated groups tends to be left unreacted, resulting in the gelation of the acrylic resin.

The proportion of the other copolymerizable monomer (a5) is preferably not greater than 50 wt. %, particularly preferably not greater than 40 wt. %, more preferably not greater than 20 wt. %, based on the weight of the overall copolymerization component. If the proportion of the other copolymerizable monomer (a5) is excessively great, the heat resistance and the adhesive strength tend to be reduced.

The acrylic resins to be used in the present disclosure can each be prepared by selectively polymerizing the copolymerization component described above.

A conventionally known polymerization method such as solution polymerization method, suspension polymerization method, bulk polymerization method or emulsion polymerization method may be used for the polymerization. In the present disclosure, the solution polymerization method is preferred, because the acrylic resins can each be safely and stably prepared as having a desired monomer formulation.

A preferred example of the preparation method for preparing each of the acrylic resins to be used in the present disclosure will hereinafter be described.

First, the copolymerization component and a polymerization initiator are mixed with or added dropwise to an organic solvent, and subjected to solution polymerization, whereby an acrylic resin solution is prepared.

[Organic Solvent]

Examples of the organic solvent to be used for the polymerization reaction include: aromatic hydrocarbons such as toluene and xylene; aliphatic hydrocarbons such as hexane; esters such as ethyl acetate and butyl acetate; aliphatic alcohols such as n-propyl alcohol and isopropyl alcohol; and ketones such as acetone, methyl ethyl ketone, methyl isobutyl ketone, and cyclohexanone. These may be used alone or in combination. Of these solvents, organic solvents having a boiling point of not higher than 80° C. are preferably used because a solvent-free acrylic resin can be efficiently prepared by evaporating the solvent away from the acrylic resin solution prepared by the solution polymerization.

Examples of the solvents having a boiling point of not higher than 80° C. include: hydrocarbon solvents such as n-hexane (67° C.); alcohol solvents such as methanol (65° C.); ester solvents such as ethyl acetate (77° C.) and methyl acetate (54° C.); ketone solvents such as methyl ethyl ketone (80° C.) and acetone (56° C.); diethyl ether (35° C.), methylene chloride (40° C.), and tetrahydrofuran (66° C.). Of these, ethyl acetate, acetone, and methyl acetate are preferred, and ethyl acetate and acetone are particularly preferred from the viewpoint of versatility and safety.

The parenthesized numerals following the respective organic solvent names indicate the boiling points of the organic solvents.

[Polymerization Initiator]

Ordinary radical polymerization initiators such as azo polymerization initiator and peroxide polymerization initiator are usable as the polymerization initiator for the polymerization reaction. Examples of the azo polymerization initiator include 2,2'-azobis(2-methylbutyronitrile), 2,2'-azobisisobutyronitrile, (1-phenylethyl)azodiphenylmethane, 2,2'-azobis (2,4-dimethylvaleronitrile), 2,2'-azobis(2-cyclopropylpropionitrile), and 2,2'-azobis(4-methoxy-2,4-dimethylvaleronitrile). Examples of the peroxide polymerization initiator include benzoyl peroxide, di-t-butyl peroxide, cumene hydroperoxide, lauroyl peroxide, t-butyl peroxypivalate, t-hexyl peroxypivalate, t-hexyl peroxyneodecanoate, diisopropyl peroxycarbonate, and diisobutyryl peroxide. These may be used alone or in combination.

In the preparation of the acrylic resin, the polymerization is preferably allowed to proceed at a relatively low temperature by using the organic solvent having a boiling point of not higher than 80° C. as the reaction solvent for the solution polymerization. If a polymerization initiator having a higher 10-hour half-life temperature is used, the polymerization initiator is liable to remain. The remaining polymerization initiator is liable to cause the gelation of the acrylic resin in the subsequent step of evaporating the solvent away from the acrylic resin solution.

In order to stably perform the step of evaporating the solvent away from the acrylic resin solution prepared by the solution polymerization, therefore, it is preferred to use a polymerization initiator having a 10-hour half-life temperature of not higher than 60° C. out of the aforementioned polymerization initiators. Particularly, 2,2'-azobis(2,4-dimethylvaleronitrile) (52° C.), 2,2'-azobis(2-cyclopropylpropionitrile) (49.6° C.), 2,2'-azobis(4-methoxy-2,4-dimethylvaleronitrile) (30° C.), t-butyl peroxypivalate (54.6° C.), t-hexyl peroxypivalate (53.2° C.), t-hexyl peroxyneodecanoate (44.5° C.), diisopropyl peroxycarbonate (40.5° C.), and diisobutyryl peroxide (32.7° C.) are preferred, and 2,2'-azobis(2,4-dimethylvaleronitrile) (52° C.) and t-hexyl peroxypivalate (53.2° C.) are more preferred.

The parenthesized numerals following the respective compound names indicate the 10-hour half-life temperatures of the compounds.

The amount of the polymerization initiator to be used is typically 0.001 to 10 parts by weight, preferably 0.1 to 8 parts by weight, particularly preferably 0.5 to 6 parts by weight, more preferably 1 to 4 parts by weight, especially preferably 1.5 to 3 parts by weight, most preferably 2 to 2.5 parts by weight, based on 100 parts by weight of the polymerization component. If the use amount of the polymerization initiator is excessively small, the polymerization degree of the acrylic resin tends to be reduced, thereby increasing the remaining monomer amount. Further, the acrylic resin tends to have a lower weight average molecular weight. If the use amount of the polymerization initiator is excessively great, the gelation of the acrylic resin tends to occur in the subsequent step of evaporating the solvent away from the acrylic resin solution.

[Polymerization Conditions]

Conventionally known polymerization conditions may be employed for the solution polymerization. For example, the polymerization component and the polymerization initiator are mixed with or added dropwise to the solvent, and the polymerization reaction is allowed to proceed under predetermined polymerization conditions.

A polymerization temperature for the polymerization reaction is typically 40° C. to 120° C. and, in the present disclosure, is preferably 50° C. to 90° C., particularly preferably 55° C. to 75° C., more preferably 60° C. to 70° C., from the viewpoint of the stable reaction. If the polymerization temperature is excessively high, the acrylic resin is susceptible to the gelation. If the polymerization temperature is excessively low, the activity of the polymerization initiator tends to be lowered to reduce the polymerization degree, thereby increasing the remaining monomer amount.

A polymerization period for the polymerization reaction is not particularly limited (where additional heating to be described later is carried out, a polymerization period before the start of the additional heating is not particularly limited). The polymerization period is preferably not shorter than 0.5 hours, particularly preferably not shorter than 1 hour, more preferably not shorter than 2 hours, especially preferably not shorter than 5 hours, from the last addition of the polymerization initiator. The upper limit of the polymerization period is typically 72 hours.

The polymerization reaction is preferably allowed to proceed under reflux of the solvent from the viewpoint of easier removal of heat.

In the preparation of the acrylic resin, the additional heating is preferably carried out to thermally decompose the polymerization initiator for reduction of the amount of the remaining polymerization initiator.

The temperature for the additional heating is preferably higher than the 10-hour half-life temperature of the polymerization initiator, typically 40° C. to 150° C. For suppression of the gelation, the temperature for the additional heating is preferably 55° C. to 130° C., particularly preferably 75° C. to 95° C. If the additional heating temperature is excessively high, the acrylic resin tends to be yellowed. If the additional heating temperature is excessively low, the polymerization component and the polymerization initiator are liable to remain, and the acrylic resin tends to be poorer in long-term stability and heat stability.

Thus, the acrylic resin solution can be prepared.

The acrylic resin to be used in the present disclosure is preferably a solvent-free acrylic resin containing no solvent. Therefore, the solvent is evaporated away from the acrylic resin solution.

In the step of evaporating the solvent away from the acrylic resin solution, a generally known method may be employed. Exemplary methods for the evaporation of the solvent include a method in which the solvent is evaporated away by heating, and a method in which the solvent is evaporated away by pressure reduction. A preferred method for efficient solvent evaporation is a method in which the solvent is evaporated away by heating under reduced pressure.

A temperature for the evaporation of the solvent by heating is preferably 60° C. to 150° C. In order to significantly reduce the remaining solvent amount, the solvent is particularly preferably evaporated away from the reaction solution obtained after the polymerization of the acrylic resin by maintaining the reaction solution at 60° C. to 80° C. and then at 80° C. to 150° C. For suppression of the gelation of the acrylic resin, it is not preferred to maintain the reaction solution at a temperature of higher than 150° C. for the evaporation of the solvent.

A pressure for the evaporation of the solvent under reduced pressure is preferably 20 to 101.3 kPa. In order to significantly reduce the remaining solvent amount, the solvent is particularly preferably evaporated away from the reaction solution by maintaining the reaction solution at 50 to 101.3 kPa and then at 0 to 50 kPa.

Thus, the solvent-free acrylic resin can be prepared.

<Acrylic Resin (X)>

The acrylic resin (X) to be used in the present disclosure typically contains a structural unit derived from the hydroxyl-containing monomer (a1) in a proportion of 5 to 60 wt. %, preferably 8 to 45 wt. %, particularly preferably 10 to 40 wt. %, more preferably 11 to 35 wt. %, especially preferably 12 to 30 wt. %.

Further, the acrylic resin (X) typically contains a structural unit derived from the (meth)acrylate (a3-1) in a proportion of 5 to 40 wt. %, preferably 7 to 30 wt. %, particularly preferably 10 to 25 wt. %.

In the present disclosure, the proportions (formulation proportions) of the structural units derived from the respective monomers in the acrylic resin are determined, for example, by NMR.

The acrylic resin (X) has a glass transition temperature ($T_X$) of not higher than −20° C., more preferably not higher than −22° C., particularly preferably not higher than −23° C., to ensure excellent bending durability. If the glass transition temperature is excessively high, the bending durability tends to be reduced. The lower limit of the glass transition temperature of the acrylic resin (X) is typically −45° C.

In the present disclosure, the glass transition temperature is defined as a temperature at which the loss tangent of the dynamic viscoelasticity (loss elastic modulus G"/storage elastic modulus G'=tan δ) is maximum when the dynamic viscoelasticity is measured in a shear deformation mode by means of a dynamic viscoelasticity measuring apparatus.

The acrylic resin (X) preferably has a weight average molecular weight of not less than 10,000, particularly preferably 100,000 to 1,500,000, more preferably 200,000 to 1,000,000, especially preferably 250,000 to 800,000, most preferably 300,000 to 600,000. If the weight average molecular weight is excessively small, the cohesive force and the durability tend to be reduced. If the weight average molecular weight is excessively great, the coatability and the handling ease tend to be deteriorated due to an excessively high viscosity.

In the present disclosure, the weight average molecular weight is determined based on standard polystyrene molecular weight through measurement by a high-performance liquid chromatography (HLC-8320GPC available from Tosoh Corporation) with the use of three columns TSKgel GMHXL (each having an exclusion limit molecular weight of $4\times10^8$, a separation range of 100 to $4\times10^8$, and a theoretical stage number of 14,000 stages per column, and filled with a column packing material of styrene-divinylbenzene copolymer having a particle diameter of 9 μm, and having a column size of 7.8 mm I.D.×30 cm) and a column TSKgel G2000HXL (having an exclusion limit molecular weight of $1\times10^4$, a separation range of 100 to $1\times10^4$, and a theoretical stage number of 16,000 stages per column, and filled with a column packing material of styrene-divinylbenzene copolymer having a particle diameter of 5 μm, and having a column size of 7.8 mm I.D.×30 cm) connected in series to the high-performance liquid chromatography. The number average molecular weight can also be determined in the same manner as described above. The dispersion degree is determined based on the weight average molecular weight and the number average molecular weight.

The acrylic resin (X) preferably has an acid value of 0.001 to 2 mg KOH/g, particularly preferably 0.001 to 1 mg KOH/g, more preferably 0.001 to 0.5 mg KOH/g. If the acid value is excessively high, the heat stability tends to be poorer.

In the present disclosure, the acid value is determined by neutralization titration in conformity with JIS K0070.

The acrylic resin (X) is preferably a solvent-free acrylic resin containing substantially no solvent from the viewpoint of easy formation of a thicker adhesive layer and from the environmental viewpoint. Particularly, the acrylic resin (X) preferably has a solvent content of not greater than 2 wt. %, more preferably 0.00001 to 2 wt. %, especially preferably 0.0001 to 1 wt. %, most preferably 0.001 to 0.1 wt. %. If the solvent content is excessively great, an adhesive layer formed by using the adhesive composition for the adhesive agent tends to be foamed, suffering from reduction in durability.

The acrylic resin (X) preferably has a remaining monomer amount of not greater than 2 wt. %, particularly preferably 0.00001 to 1.5 wt. %, more preferably 0.0001 to 1.2 wt. %. If the remaining monomer amount is excessively great, the molecular weight tends to be increased by heating, thereby deteriorating the coatability and the adhesive properties. Further, the adhesive agent tends to be foamed, suffering from reduction in durability.

The solvent content and the remaining monomer amount of the acrylic resin (X) are determined with the use of a solution obtained by diluting the acrylic resin (X) 20 times with toluene by means of a gas chromatography/mass fragment detector (including GC 7890A GC system available from Agilent Technologies, Inc. and MSD 5975 inert available from Agilent Technologies, Inc.)

In the present disclosure, the amount of a volatile component (typically mainly including the solvent and the remaining monomers) contained in the acrylic resin (X) is preferably not greater than 2 wt. %, particularly preferably 0.00001 to 1.5 wt. %, more preferably 0.0001 to 1.2 wt. %. If the remaining monomer amount is excessively great, the molecular weight of the acrylic resin tends to be increased by heating, thereby deteriorating the coatability. Further, the adhesive agent prepared by using the adhesive composition tends to have poorer adhesive properties and to have poorer durability due to foaming.

The amount of the volatile component contained in the acrylic resin (X) is determined by heating the acrylic resin in a hot air dryer at 130° C. for 1 hour, and calculating a difference between the weights of the acrylic resin before and after the heating from the following expression: Volatile component amount (wt. %)=(Wa−Wb)/Wa×100 wherein Wa is the weight of the acrylic resin before the heating, and Wb is the weight of the acrylic resin after the heating.

The acrylic resin (X) is a main component of the adhesive composition [I]. From the viewpoint of the durable reliability, the proportion of the acrylic resin (X) in the adhesive composition [I] is preferably not less than 80 wt. %, particularly preferably 90 to 99.9 wt. %, more preferably 95 to 99.9 wt. %, based on the weight of the overall adhesive composition [I].

As described above, the acrylic resin (X) may include a single acrylic resin, but preferably includes at least two acrylic resins having different glass transition temperatures.

The acrylic resin (X) including at least two acrylic resins having different glass transition temperatures is typically prepared by separately preparing the acrylic resins having different glass transition temperatures and mixing the acrylic resins thus prepared. The acrylic resin (X) including at least two acrylic resins having different glass transition temperatures may be prepared by giving consideration to the polymerization method, e.g., by employing a two-step polymerization method or the like.

The number of the acrylic resins prepared as having different glass transition temperatures to be mixed together is typically two to four, preferably two to three, particularly preferably two. As the number of the acrylic resins for the acrylic resin (X) is increased, the productivity and the economic efficiency tend to be reduced. A preferred embodiment will hereinafter be described in which the acrylic resin (X) includes two or more acrylic resins.

Where the acrylic resin (X) includes two or more acrylic resins, the acrylic resin (X) preferably includes an acrylic resin (X1) having the highest glass transition temperature and an acrylic resin (X2) having the lowest glass transition temperature.

The acrylic resins (X1) and (X2) preferably each contain a structural unit derived from the hydroxyl-containing monomer (a1). In the acrylic resins (X1) and (X2), the structural unit derived from the hydroxyl-containing monomer (a1) is typically present in a proportion of 5 to 60 wt. %, preferably 8 to 45 wt. %, particularly preferably 10 to 40 wt. %, more preferably 11 to 35 wt. %, especially preferably 12 to 30 wt. %.

Further, the acrylic resins (X1) and (X2) preferably each include a structural unit derived from at least one (meth) acrylate (a3-1) selected from the group consisting of methyl (meth)acrylate and ethyl (meth)acrylate in addition to the structural unit derived from the hydroxyl-containing monomer (a1). The structural unit derived from the (meth)acrylate (a3-1) is typically present in a proportion of 5 to 40 wt. %, preferably 7 to 30 wt. %, especially preferably 10 to 25 wt. %, based on the weight of the acrylic resin.

In the acrylic resin (X1), the structural unit derived from the (meth)acrylate (a3-1) particularly preferably includes a structural unit derived from methyl (meth)acrylate and a structural unit derived from ethyl (meth)acrylate for excellent adhesive strength.

In the acrylic resin (X2), the structural unit derived from the (meth)acrylate (a3-1) particularly preferably includes a structural unit derived from ethyl (meth)acrylate for excellent bending durability and excellent adhesive strength.

The acrylic resin (X1) preferably has a glass transition temperature ($T_{X1}$) of −25° C. to −10° C., more preferably −23° C. to −12° C., particularly preferably −21° C. to −15° C. If the glass transition temperature is excessively low, the adhesive strength tends to be reduced. If the glass transition temperature is excessively high, the bending durability tends to be reduced.

The glass transition temperature ($T_{X2}$) of the acrylic resin (X2) is lower than the glass transition temperature of the acrylic resin (X1), and is preferably −35° C. to −20° C., more preferably −33° C. to −23° C., particularly preferably −30° C. to −25° C. If the glass transition temperature is excessively low, the durability in a bent state tends to be reduced. If the glass transition temperature is excessively high, the bending durability tends to be reduced.

In order to satisfy all the requirements for the compatibility of the acrylic resins, the adhesive strength, and the bending durability, a temperature difference between the glass transition temperature ($T_{X1}$) of the highest-glass transition temperature acrylic resin (X1) and the glass transition temperature ($T_{X2}$) of the lowest-glass transition temperature acrylic resin (X2) is not greater than 20° C., preferably not greater than 15° C., particularly preferably not greater than 10° C., more preferably not greater than 8° C. If the temperature difference between the glass transition temperatures is excessively great, the resins tend to be less compatible. The lower limit of the temperature difference is preferably 3° C., particularly preferably 4° C. If the temperature difference is excessively small, either of the adhesive strength and the bending durability tends to be reduced.

The acrylic resins (X1) and (X2) preferably each have a weight average molecular weight of not less than 10,000, particularly preferably 100,000 to 1,500,000, more preferably 200,000 to 1,000,000, especially preferably 250,000 to 800,000, most preferably 300,000 to 600,000. If the weight average molecular weight is excessively small, the cohesive force and the durability tend to be reduced. If the weight average molecular weight is excessively great, the coatability and the handling ease tend to be deteriorated due to an excessively high viscosity.

The acrylic resins (X1) and (X2) preferably each have a dispersion degree ((weight average molecular weight)/(number average molecular weight)) of not higher than 15, particularly preferably not higher than 10, more preferably not higher than 7, especially preferably not higher than 5. If the dispersion degree is excessively high, the adhesive layer tends to be poorer in durability and to suffer from foaming and the like. If the dispersion degree is excessively low, the handling ease tends to be deteriorated. The lower limit of the dispersion degree is typically 1.1 from the viewpoint of the limitation on the production.

A difference between the weight average molecular weight ($Mw_{X1}$) of the highest-glass transition temperature acrylic resin (X1) and the weight average molecular weight ($Mw_{X2}$) of the lowest-glass transition temperature acrylic resin (X2) preferably satisfies the following expression:

$$(Mw_{X1})-(Mw_{X2}) \geq -100,000$$

In order to satisfy all the requirements for the adhesive strength, the bending durability, and the reliability in a bent state, a value obtained by subtracting ($Mw_{X2}$) from ($Mw_{X1}$) is preferably not less than −100,000, particularly preferably not less than 0. If the value obtained by subtracting ($Mw_{X2}$)

from ($Mw_{X1}$) is excessively small, the adhesive strength and the reliability in the bent state tend to be reduced. The upper limit of the above expression is typically 2,000,000. If the upper limit is excessively great, the resins tend to be less compatible.

Exemplary methods for preparing the acrylic resin (X) by mixing the acrylic resin (X1) and the acrylic resin (X2) include a method in which a solution of the acrylic resin (X1) and a solution of the acrylic resin (X2) are mixed together and then the solvent is evaporated away from the resulting solution mixture, and a method in which a solvent-free acrylic resin (X1) and a solvent-free acrylic resin (X2) are mixed together. Particularly, the method in which the solution of the acrylic resin (X1) and the solution of the acrylic resin (X2) are mixed together and then the solvent is evaporated away from the resulting solution mixture is preferred from the viewpoint of the working efficiency.

Thus, the acrylic resin (X) is prepared.

Where the acrylic resin (X) includes the two or more acrylic resins having different glass transition temperatures, these acrylic resins can be identified, for example, by dissolving the acrylic resin (X) (or the adhesive composition [I]) at a concentration of about 0.1 wt. % with tetrahydrofuran (THF) to prepare a sample solution, and then analyzing the sample solution by a gradient method by means of HPLC using an ODS (octadecyl silyl) column. In the gradient method, for example, acetonitrile and THF are used as mobile phases, and the mixing ratio between acetonitrile and THF is changed.

Where the acrylic resin (X) includes the acrylic resin (X1) and the acrylic resin (X2), the weight ratio ((X1)/(X2)) between the acrylic resin (X1) and the acrylic resin (X2) is preferably 70/30 to 30/70, more preferably 65/35 to 40/60, particularly preferably 60/40 to 50/50, in order to satisfy the requirements for the adhesive strength and the bending durability. If the ratio of the acrylic resin (X1) is excessively small (the ratio of the acrylic resin (X2) is excessively great), the adhesive strength and the reliability in a high-temperature and high-humidity environment tend to be reduced. If the ratio of the acrylic resin (X1) is excessively great (the ratio of the acrylic resin (X2) is excessively small), the bending durability tends to be reduced.

The weight ratio between the amount of the hydroxyl-containing monomer (a1) for the acrylic resin (X1) and the amount of the hydroxyl-containing monomer (a1) for the acrylic resin (X2) is preferably 3:1 to 1:3, particularly preferably 2:1 to 1:2, more preferably 1:1 to 1:1.5. If the amount of the hydroxyl-containing monomer (a1) for the acrylic resin (X1) is excessively small, the adhesive agent prepared by using the adhesive composition tends to be poorer in adhesive strength. If the amount of the hydroxyl-containing monomer (a1) for the acrylic resin (X1) is excessively great, the adhesive agent prepared by using the adhesive composition tends to be poorer in bending durability. If a difference in the amount of the hydroxyl-containing monomer (a1) between the acrylic resin (X1) and the acrylic resin (X2) is excessively great, the resins tend to be less compatible, and the moist heat resistance tends to be reduced.

The total proportion of the acrylic resin (X1) and the acrylic resin (X2) is typically not less than 50 wt. %, preferably not less than 80 wt. %, more preferably not less than 90 wt. %, still more preferably 100 wt. %, based on the weight of the acrylic resin (X).

The acid values of the respective acrylic resins of the acrylic resin (X) preferably each fall within the same range as that for the acrylic resin (X).

<Acrylic Resin (Y)>

The acrylic resin (Y) to be used in the present disclosure includes the acrylic resin (Y2) prepared by copolymerization using the hydroxyl-containing monomer (a1) including 2-hydroxyethyl (meth)acrylate and 4-hydroxybutyl (meth) acrylate as the copolymerization component, and preferably includes at least two acrylic resins having different glass transition temperatures.

From the viewpoint of excellent repetitive bending durability, the acrylic resin (Y) has a glass transition temperature (Ty) of not higher than −20° C., preferably not higher than −22° C., particularly preferably not higher than −23° C. If the glass transition temperature is excessively high, the repetitive bending durability and the step followability tend to be poorer. The lower limit of the glass transition temperature of the acrylic resin (Y) is typically −45° C.

The acrylic resin (Y) preferably has a weight average molecular weight of not less than 10,000, particularly preferably 100,000 to 1,500,000, more preferably 200,000 to 1,000,000, especially preferably 250,000 to 800,000, most preferably 300,000 to 600,000. If the weight average molecular weight is excessively small, the cohesive force and the durability tend to be reduced. If the weight average molecular weight is excessively great, the coatability and the handling ease tend to be deteriorated due to an excessively high viscosity.

The acrylic resin (Y) preferably has a dispersion degree ((weight average molecular weight)/(number average molecular weight)) of not higher than 15, particularly preferably not higher than 10, more preferably not higher than 7, especially preferably not higher than 5. If the dispersion degree is excessively high, the adhesive layer tends to be poorer in durability and to suffer from foaming and the like. If the dispersion degree is excessively low, the handling ease tends to be deteriorated. The lower limit of the dispersion degree is typically 1.1 from the viewpoint of the limitation on the production.

The acrylic resin (Y) preferably has an acid value of 0.001 to 2 mg KOH/g, particularly preferably 0.001 to 1 mg KOH/g, more preferably 0.001 to 0.5 mg KOH/g. If the acid value is excessively high, the heat stability tends to be poorer.

In the present disclosure, the acrylic resin (Y) is preferably a solvent-free acrylic resin containing substantially no solvent. Particularly, the acrylic resin (Y) preferably has a solvent content of not greater than 2 wt. %, more preferably 0.00001 to 2 wt. %, especially preferably 0.0001 to 1 wt. %, most preferably 0.001 to 0.1 wt. %. If the solvent content is excessively great, the adhesive layer formed by using the adhesive composition for the adhesive agent tends to be foamed, suffering from reduction in durability.

In the present disclosure, the acrylic resin (Y) preferably has a remaining monomer amount of not greater than 2 wt. %, particularly preferably 0.00001 to 1.5 wt. %, more preferably 0.0001 to 1.2 wt. %. If the remaining monomer amount is excessively great, the molecular weight tends to be increased by heating, thereby deteriorating the coatability and the adhesive properties. Further, the adhesive agent tends to be foamed, suffering from reduction in durability.

In the present disclosure, the amount of a volatile component (typically mainly including the solvent and the remaining monomers) contained in the acrylic resin (Y) is preferably not greater than 2 wt. %, particularly preferably 0.00001 to 1.5 wt. %, more preferably 0.0001 to 1.2 wt. %. If the remaining monomer amount is excessively great, the molecular weight of the acrylic resin (Y) tends to be increased by heating, thereby deteriorating the coatability.

Further, the adhesive agent prepared by using the adhesive composition tends to have poorer adhesive properties and to have poorer durability due to foaming.

The solvent content and the volatile component amount of the acrylic resin (Y) can be determined by the same method as employed for the acrylic resin (X).

The acrylic resin (Y) is a main component of the adhesive composition [II]. From the viewpoint of the durable reliability, the proportion of the acrylic resin (Y) in the adhesive composition [II] is preferably not less than 50 wt. %, particularly preferably 80 to 99.9 wt. %, more preferably 90 to 99.9 wt. %, based on the weight of the overall adhesive composition [II].

As described above, the acrylic resin (Y) preferably includes at least two acrylic resins having different glass transition temperatures.

The acrylic resin (Y) including at least two acrylic resins having different glass transition temperatures is typically prepared by the aforementioned method or the like by separately preparing the acrylic resins having different glass transition temperatures and mixing the acrylic resins thus prepared. The acrylic resin (Y) including at least two acrylic resins having different glass transition temperatures may be prepared by giving consideration to the polymerization method, e.g., by employing a two-step polymerization method or the like.

The number of the acrylic resins prepared as having different glass transition temperatures to be mixed together is typically two to four, preferably two to three, particularly preferably two. As the number of the acrylic resins for the acrylic resin (Y) is increased, the productivity and the economic efficiency tend to be reduced.

Exemplary methods for preparing the acrylic resin (Y) by mixing at least two acrylic resins having different glass transition temperatures include a method in which at least two acrylic resin solutions are mixed together and then the solvent is evaporated away from the resulting solution mixture, and a method in which at least two solvent-free acrylic resins are mixed together. Of these, the method in which at least two acrylic resin solutions are mixed together and then the solvent is evaporated away from the resulting solution mixture is preferred from the viewpoint of the working efficiency.

Where the acrylic resin (Y) includes the two or more acrylic resins having different glass transition temperatures, the acrylic resins for the acrylic resin (Y) can be identified in the same manner as described for the acrylic resin (X).

Particularly, an acrylic resin having the lowest glass transition temperature in the acrylic resin (Y) is preferably the acrylic resin (Y2) prepared by copolymerization using the hydroxyl-containing monomer (a1) including 2-hydroxyethyl (meth)acrylate and 4-hydroxybutyl (meth)acrylate as the copolymerization component from the viewpoint of excellent bending durability and excellent adhesive strength.

Where the acrylic resin (Y) includes the two or more acrylic resins having different glass transition temperatures, a temperature difference between the glass transition temperature ($T_{Y1}$) of a highest-glass transition temperature acrylic resin (Y1) and the glass transition temperature ($T_{Y2}$) of a lowest-glass transition temperature acrylic resin (Y2) out of the acrylic resins is not greater than 20° C., preferably not greater than 15° C., particularly preferably not greater than 10° C., more preferably 8° C., in order to satisfy the requirements for the compatibility of the acrylic resins, the adhesive strength, and the bending durability. If the temperature difference between the glass transition temperatures is excessively great, the resins tend to be less compatible. The lower limit of the temperature difference is preferably 3° C., particularly preferably 4° C. If the temperature difference is excessively small, either of the adhesive strength and the bending durability tends to be reduced.

The glass transition temperature ($T_{Y1}$) of the acrylic resin (Y1) is preferably −25° C. to −10° C., more preferably −23° C. to −12° C., particularly preferably −21° C. to −15° C., from the viewpoint of excellent adhesive strength. If the glass transition temperature is excessively low, the adhesive strength tends to be reduced. If the glass transition temperature is excessively high, the repetitive bending durability tends to be reduced.

The glass transition temperature ($T_{Y2}$) of the acrylic resin (Y2) is lower than the glass transition temperature of the acrylic resin (Y1), and is preferably −35° C. to −20° C., more preferably −33° C. to −23° C., particularly preferably −30° C. to −25° C., from the viewpoint of excellent adhesive strength. If the glass transition temperature is excessively low, the reliability (durability) in a bent state tends to be reduced. If the glass transition temperature is excessively high, the repetitive bending durability tends to be reduced.

The temperature difference between the glass transition temperature ($T_{Y1}$) of the acrylic resin (Y1) and the glass transition temperature ($T_{Y2}$) of the acrylic resin (Y2) is set within the predetermined range by properly adjusting the types and the amounts of the monomers for the polymerization component.

The acrylic resins (Y1) and (Y2) preferably each have a weight average molecular weight of not less than 10,000, particularly preferably 100,000 to 1,500,000, more preferably 200,000 to 1,000,000, especially preferably 250,000 to 800,000, most preferably 300,000 to 600,000. If the weight average molecular weight is excessively small, the cohesive force and the durability tend to be reduced. If the weight average molecular weight is excessively great, the coatability and the handling ease tend to be deteriorated due to an excessively high viscosity.

The acrylic resins (Y1) and (Y2) preferably each have a dispersion degree ((weight average molecular weight)/(number average molecular weight)) of not higher than 15, particularly preferably not higher than 10, more preferably not higher than 7, especially preferably not higher than 5. If the dispersion degree is excessively high, the adhesive layer tends to be poorer in durability and to suffer from foaming and the like. If the dispersion degree is excessively low, the handling ease tends to be deteriorated. The lower limit of the dispersion degree is typically 1.1 from the viewpoint of the limitation on the production.

A difference between the weight average molecular weight ($Mw_{Y1}$) of the highest-glass transition temperature acrylic resin (Y1) and the weight average molecular weight ($Mw_{Y2}$) of the lowest-glass transition temperature acrylic resin (Y2) preferably satisfies the following expression:

$$(Mw_{Y1})-(Mw_{Y2}) \geq -100{,}000$$

In order to satisfy all the requirements for the adhesive strength, the bending durability, and the reliability in a bent state, a value obtained by subtracting ($Mw_{Y2}$) from ($Mw_{Y1}$) is preferably not less than −100,000, particularly preferably not less than 0. If the value obtained by subtracting ($Mw_{Y2}$) from ($Mw_{Y1}$) is excessively small, the adhesive strength and the reliability in the bent state tend to be reduced. The upper limit of the above expression is typically 2,000,000. If the upper limit is excessively great, the resins tend to be less compatible.

Particularly, the acrylic resin (Y1) preferably contains structural units derived from methyl (meth)acrylate and ethyl (meth)acrylate as the (meth)acrylate (a3-1) from the viewpoint of excellent adhesive strength.

Particularly, the acrylic resin (Y2) preferably contains a structural unit derived from ethyl (meth)acrylate as the (meth)acrylate (a3-1) from the viewpoint of excellent adhesive strength.

The weight ratio ((Y1)/(Y2)) of the acrylic resin (Y1) to the acrylic resin (Y2) is preferably 70/30 to 30/70, more preferably 65/35 to 40/60, particularly preferably 60/40 to 50/50, in order to satisfy the requirements for the adhesive strength and the bending durability. If the ratio of the acrylic resin (Y1) is excessively small (the ratio of the acrylic resin (Y2) is excessively great), the adhesive strength and the reliability in the bent state tend to be reduced. If the ratio of the acrylic resin (Y1) is excessively great (the ratio of the acrylic resin (Y2) is excessively small), the repetitive bending durability tends to be reduced.

The weight ratio between the amount of the hydroxyl-containing monomer (a1) for the acrylic resin (Y1) and the amount of the hydroxyl-containing monomer (a1) for the acrylic resin (Y2) is preferably 3:1 to 1:3, particularly preferably 2:1 to 1:2, more preferably 1:1 to 1:1.5. If the amount of the hydroxyl-containing monomer (a1) for the acrylic resin (Y1) is excessively small, the adhesive agent prepared by using the adhesive composition tends to be poorer in adhesive strength. If the amount of the hydroxyl-containing monomer (a1) for the acrylic resin (Y1) is excessively great, the adhesive agent prepared by using the adhesive composition tends to be poorer in bending durability. If a difference in the amount of the hydroxyl-containing monomer (a1) between the acrylic resin (Y1) and the acrylic resin (Y2) is excessively great, the resins tend to be less compatible, and the moist heat resistance tends to be reduced.

The total proportion of the acrylic resin (Y1) and the acrylic resin (Y2) is typically not less than 50 wt. %, preferably not less than 80 wt. %, more preferably not less than 90 wt. %, still more preferably 100 wt. %, based on the weight of the acrylic resin (Y).

The acid values of the respective acrylic resins of the acrylic resin (Y) preferably each fall within the same range as that for the acrylic resin (Y).

[Carbodiimide Compound]

The adhesive composition [I], [II] of the present disclosure preferably contains a carbodiimide compound in addition to the acrylic resin (X) or (Y).

Examples of the carbodiimide compound include: monocarbodiimides such as bis(2,6-diisopropylphenyl)carbodiimide, dicyclohexylcarbodiimide, diisopropylcarbodiimide, dimethylcarbodiimide, diisobutylcarbodiimide, dioctylcarbodiimide, t-butylisopropylcarbodiimide, diphenylcarbodiimide, di-t-butylcarbodiimide, and didodecylcarbodiimide; polycarbodiimides having a plurality of carbodiimides; and cyclic carbodiimides. These may be used alone or in combination. Of these, a monocarbodiimide compound (b1) is preferred, and bis(2,6-diisopropylphenyl)carbodiimide is more preferred from the viewpoint of the heat resistance.

In the present disclosure, the proportion of the carbodiimide compound is preferably 0.01 to 10 parts by weight, particularly preferably 0.1 to 5 parts by weight, more preferably 0.2 to 2 parts by weight, especially preferably 0.3 to 1 part by weight, based on 100 parts by weight of the acrylic resin (X), (Y).

If the proportion of the carbodiimide compound is excessively small, the acrylic resin (X), (Y) tends to be poorer in heat stability. If the proportion of the carbodiimide compound is excessively great, the durability tends to be reduced.

[Photopolymerization Initiator]

The adhesive composition [I], [II] of the present disclosure is cured to form an adhesive layer. Where active energy radiation to be described later is applied for the curing, a photopolymerization initiator is preferably used in order to stabilize the reaction during the application of the active energy radiation.

The photopolymerization initiator is not particularly limited, as long as it is capable of generating radicals by the action of light. Examples of the photopolymerization initiator include acetophenones, benzoins, benzophenones, thioxanthones, and acylphosphine oxides. These photopolymerization initiators may be used alone or in combination. Of these photopolymerization initiators, benzophenones of hydrogen extraction type and acetophenones of intramolecular cleavage type are preferred as the photopolymerization initiator because of their capability of efficient intermolecular or intramolecular crosslinking.

The proportion of the photopolymerization initiator is preferably 0.01 to 10 parts by weight, particularly preferably 0.1 to 5 parts by weight, more preferably 0.5 to 2 parts by weight, based on 100 parts by weight of the acrylic resin (X) or (Y). If the proportion of the photopolymerization initiator is excessively small, the curing rate tends to be reduced, or the curing tends to be insufficient. Even if the proportion of the photopolymerization initiator is excessively great, the curability is not improved, but poorer economy tends to result.

Exemplary assisting agents for the aforementioned photopolymerization initiators include triethanolamine, triisopropanolamine, 4,4'-dimethylaminobenzophenone (Michler's ketone), 4,4'-diethylaminobenzophenone, 2-dimethylaminoethylbenzoic acid, ethyl 4-dimethylaminobenzoate, (n-butoxy)ethyl 4-dimethylaminobenzoate, isoamyl 4-dimethylaminobenzoate, 2-ethylhexyl 4-dimethylaminobenzoate, 2,4-diethylthioxanthone, and 2,4-diisopropylthioxanthone. These assisting agents may be used alone or in combination.

[Active Energy Radiation-Curable Monomer]

Where the active energy radiation is applied for the curing, an active energy radiation-curable monomer is preferably used. This makes it possible to control the cohesive force of the entire adhesive layer to thereby impart the adhesive layer with stable adhesive properties.

A polyfunctional monomer containing two or more ethylenically unsaturated groups in its molecule is preferred as the active energy radiation-curable monomer. Examples of the active energy radiation-curable monomer include hexanediol di(meth)acrylate, butanediol di(meth)acrylate, (poly)ethylene glycol di(meth)acrylate, (poly)propylene glycol di(meth)acrylate, neopentyl glycol di(meth)acrylate, pentaerythritol di(meth)acrylate, pentaerythritol tri(meth)acrylate, dipentaerythritol hexa(meth)acrylate, trimethylolpropane tri(meth)acrylate, tetramethylolmethane tri(meth)acrylate, isocyanuric acid ethylene oxide-modified tri(meth)acrylate, allyl (meth)acrylate, vinyl (meth)acrylate, and urethane (meth)acrylate. These polyfunctional monomers may be used alone or in combination.

The proportion of the polyfunctional monomer is preferably 0 to 10 parts by weight, particularly preferably 0.1 to 7.5 parts by weight, more preferably 0.5 to 5 parts by weight, based on 100 parts by weight of the acrylic resin (X) or (Y).

[Other Optional Components]

The adhesive composition [I], [II] of the present disclosure (hereinafter sometimes referred to simply as "adhesive composition") may contain other optional components in addition to the photopolymerization initiator and the active energy radiation-curable monomer described above.

Examples of the other optional components include antioxidant, plasticizer, tackifier, crosslinking agent, crosslinking accelerator, silane coupling agent, antistatic agent, and functional dye. These may be used alone or in combination. The proportion of the other optional components may fall within a range that does not impair the effect of the present disclosure, and is preferably 0.1 to 10 wt. % based on the weight of the adhesive composition.

The adhesive composition of the present disclosure is prepared, for example, in the following manner by using the components described above.

The adhesive composition of the present disclosure is prepared by mixing the acrylic resin (X) or (Y) and the aforementioned components. In the preparation of the acrylic resin (X) or (Y), the photopolymerization initiator, the active energy radiation-curable monomer, and the other optional components may be blended with the acrylic resin (X) or (Y) before the evaporation of the solvent or during the evaporation of the solvent (in a state in which the solvent remains in the acrylic resin (X) or (Y)), or after the evaporation of the solvent. Particularly, the photopolymerization initiator, the active energy radiation-curable monomer, and the other optional components are preferably blended with the solvent-free acrylic resin (X) or (Y) after the evaporation of the solvent.

Where the carbodiimide compound is blended in the adhesive composition, the carbodiimide compound is added to the acrylic resin (X) or (Y) at an earlier stage than the photopolymerization initiator, the active energy radiation-curable monomer, and the other optional components from the viewpoint of the chemical stability of the resulting resin composition. Particularly, the acrylic resin (X) or (Y) and the carbodiimide compound are preferably mixed together at 0° C. to 140° C., more preferably 20° C. to 100° C.

Where the resulting adhesive composition contains the solvent, the solvent is evaporated away by the same method as employed for the evaporation of the solvent from the acrylic resin. Thus, the solvent-free adhesive composition [I], [II] (hereinafter referred to simply as "solvent-free adhesive composition") is prepared.

<Adhesive Composition and Solvent-Free Adhesive Composition>

The adhesive composition and the solvent-free adhesive composition each have an acid value of 0.001 to 0.3 mg KOH/g, preferably 0.001 to 0.15 mg KOH/g, particularly preferably 0.001 to 0.1 mg KOH/g.

The solvent-free adhesive composition of the present disclosure, which is substantially free from the solvent, has a solvent content of not greater than 2 wt. %, preferably 0.00001 to 2 wt. %, particularly preferably 0.0001 to 1 wt. %, most preferably 0.001 to 0.1 wt. %. If the solvent content is excessively great, the adhesive layer formed by using the adhesive composition for the adhesive agent tends to be foamed, thereby suffering from reduction in durability. The solvent content can be determined by the same measurement method as employed for the determination of the solvent content of the acrylic resin (X).

The solvent-free adhesive composition of the present disclosure preferably has a melt viscosity change rate (%) of not greater than 10, particularly preferably not greater than 7, more preferably not greater than 4, as determined from the following expression (1), wherein M is the melt viscosity change rate of the solvent-free adhesive composition at 130° C., and M1 and M2 are the melt viscosities of the solvent-free adhesive composition at 130° C. before and after the solvent-free adhesive composition is heat-treated at 130° C. for three hours, respectively.

If the change rate M is greater than 10, the adhesive agent prepared by using the adhesive composition tends to be poorer in coatability, making it difficult to provide desired adhesive properties.

$$M\ (\%) = (|M2 - M1|/M1) \times 100$$

M2: The melt viscosity (Pa·s) of the solvent-free adhesive composition at 130° C. after the heat treatment at 130° C. for three hours.

M1: The melt viscosity (Pa·s) of the solvent-free adhesive composition at 130° C. before the heat treatment.

The melt viscosity is measured in a nitrogen atmosphere by means of a rotary rheometer available from Anton Paar GmbH under the following conditions:

Measurement device: MCR301
Cone plate diameter: 25 mm
Measurement distance: 0.5 mm
Measurement shear rate: 0.002 (1/S)

The adhesive layer formed by curing the adhesive composition or the solvent-free adhesive composition is useful for an adhesive sheet, because the adhesive layer is excellent in adhesive strength to adherends, bending durability, and moist heat haze resistance. The adhesive composition and the solvent-free adhesive composition are also useful as a material for an adhesive agent, and are particularly useful as a material for a hot melt adhesive agent.

<Adhesive Sheet>

The adhesive composition and the solvent-free adhesive composition are each cured to form an adhesive layer, which is preferably provided on a substrate sheet for an adhesive sheet, provided on a release sheet for a double-sided adhesive sheet, or provided on an optical member for an adhesive layer-backed optical member. Exemplary curing methods include a method which uses active energy radiation for the curing, a method which uses a crosslinking agent for the curing by crosslinking, and a method including these methods in combination.

The adhesive sheet may be produced, for example, in the following manner.

In the present disclosure, the term "sheet" is not particularly intended to be distinguished from "film" or "tape" but to include the film and the tape.

First, the adhesive composition or the solvent-free adhesive composition is melted by heating and, in this state, applied onto one side or both sides of a substrate sheet, and then cooled, or the adhesive composition is melted by heating and the resulting melt is extrusion-laminated on a substrate sheet through a T-die or the like. Thus, the adhesive layer is formed as having a predetermined thickness on one side or both sides of the substrate sheet. Then, as required, a release sheet is applied onto a surface of the adhesive layer, whereby the adhesive sheet is produced.

After the adhesive layer is formed on the substrate sheet, as required, the adhesive layer may be irradiated with the active energy radiation, and further aged. Thus, the adhesive sheet is produced as having the adhesive layer formed by curing (crosslinking) the adhesive composition or the solvent-free adhesive composition.

Further, the substrateless double-sided adhesive sheet may be produced by forming the adhesive layer on a release sheet and then applying another release sheet on the opposite side of the adhesive layer.

The adhesive sheet and the double-sided adhesive sheet thus produced are used after the release sheet is removed from the adhesive layer.

Examples of the substrate sheet include: sheets of synthetic resins including polyester resins such as polyethylene naphthalate, polyethylene terephthalate, polybutylene terephthalate, and polyethylene terephthalate/isophthalate copolymer, polyolefin resins such as polyethylene, polypropylene, and polymethylpentene, polyfluoroethylene resins such as polyvinyl fluoride, polyvinylidene fluoride, and polyfluoroethylene, polyamides such as nylon 6 and nylon 6,6, vinyl polymers such as polyvinyl chloride, polyvinyl chloride/vinyl acetate copolymer, ethylene/vinyl acetate copolymer, ethylene-vinyl alcohol copolymer, polyvinyl alcohol, and vinylon, cellulose resins such as cellulose triacetate and cellophane, acrylic resins such as polymethyl methacrylate, polyethyl methacrylate, polyethyl acrylate, and polybutyl acrylate, polystyrene, polycarbonate, polyarylate, and polyimide; metal foils such as of aluminum, copper, and iron; paper sheets such as high-quality paper and glassine paper; and woven and nonwoven fabrics such as of glass fibers, natural fibers, and synthetic fibers. These sheets may be used alone as a single-layer sheet or may be used in combination as a multi-layer laminate sheet. Of these, the synthetic resin sheets are preferred for weight reduction.

Usable examples of the release sheet include those obtained by subjecting the synthetic resin sheets, the paper sheets, and the woven and nonwoven fabrics described above to a release treatment. A preferred example of the release sheet is a silicone release sheet.

A common coating method is used for the application of the adhesive composition or the solvent-free adhesive composition without particular limitation. Examples of the coating method include roll coating method, die coating method, gravure coating method, comma coating method, and screen printing method.

By the irradiation with the active energy radiation, the acrylic resin intramolecularly and/or intermolecularly forms a crosslinking structure in the adhesive composition or the solvent-free adhesive composition.

Usable examples of the active energy radiation include light radiation such as far ultraviolet radiation, middle ultraviolet radiation, near ultraviolet radiation, and infrared radiation, electromagnetic radiation such as X-ray and γ-ray, and electron beam, proton beam, and neutron beam. Of these, the ultraviolet radiation is preferred from the viewpoint of the curing rate, and the availability and the costs of an irradiation apparatus.

Where the adhesive composition or the solvent-free adhesive composition is cured by the irradiation with the ultraviolet radiation, high pressure mercury lamp, ultra-high pressure mercury lamp, carbon arc lamp, metal halide lamp, xenon lamp, chemical lamp, electrodeless discharge lamp or LED lamp capable of emitting light in a wavelength range of 150 to 450 nm may be used, and the dose of the ultraviolet radiation is typically 30 to 3,000 mJ/cm$^2$, preferably 100 to 1,500 mJ/cm$^2$.

Particularly, where a crosslinking agent is used for the adhesive composition or the solvent-free adhesive composition, an aging treatment is preferably performed. For the aging treatment, the temperature is typically a room temperature (23° C.) to 100° C., and the period is typically 1 to 30 days. Specifically, the aging treatment is performed, for example, at 23° C. for 1 to 20 days, preferably at 23° C. for 3 to 10 days, or at 40° C. for 1 to 7 days.

In the present disclosure, the adhesive layer-backed optical member may be produced by forming the adhesive layer on the optical member. Further, optical members may be bonded to each other with the use of the double-sided adhesive sheet.

The adhesive layer of the adhesive sheet preferably has a gel fraction of 10 to 100 wt. %, particularly preferably 30 to 90 wt. %, especially preferably 50 to 80 wt. %, from the viewpoint of the durability and the adhesive strength. If the gel fraction is excessively low, the cohesive force tends to be reduced, thereby reducing the durability. If the gel fraction is excessively high, the cohesive force tends to be increased, thereby reducing the adhesive strength and the bending durability.

The gel fraction is an index of the crosslinking degree (curing degree), and is calculated, for example, by the following method. An adhesive sheet (without a separator) produced by forming an adhesive layer on a substrate of a polymer sheet (e.g., PET film or the like) is wrapped with a 200-mesh stainless steel (JIS SUS) wire net, and immersed in toluene at 23° C. for 24 hours. The percentage of the weight of the adhesive layer left undissolved in the wire net after the immersion in toluene with respect to the weight of the adhesive layer before the immersion in toluene is calculated as the gel fraction. For the calculation, the weight of the substrate is subtracted from the weight of the adhesive sheet.

The gel fraction is adjusted within the aforementioned range, for example, by adjusting the dose of the active energy radiation, the amount of the photopolymerization initiator, and the type and the amount of the active energy radiation-curable monomer or, where the crosslinking agent is used, by adjusting the type and the amount of the crosslinking agent.

The adhesive layer of the adhesive sheet typically has a thickness of 15 to 3,000 μm, preferably 20 to 1,000 μm, particularly preferably 50 to 350 μm. If the thickness of the adhesive layer is excessively small, the impact-absorbing property tends to be poorer. If the thickness of the adhesive layer is excessively great, the thickness of the entire optical member tends to be increased, thereby reducing the practicality.

In the present disclosure, the thickness of the layer is determined by subtracting the thickness of a component other than the adhesive layer from the thickness of the entire laminate including the adhesive layer as measured by means of ID-C112B available from Mitutoyo Corporation.

[Adhesive Layer Formed by Curing Adhesive Composition [I] or Solvent-Free Adhesive Composition [I']]

The adhesive layer formed by curing the adhesive composition [I] or the solvent-free adhesive composition [I'] has a predetermined adhesive strength (α), a predetermined bending durability (β), and a predetermined moist heat haze resistance (γ) as measured under the following measurement conditions.

<Adhesive Strength (α)>

The adhesive strength (α) is defined as a 180-degree peel strength (N/25 mm) measured at a peel rate of 300 mm/minute by means of an autograph with the use of a sample prepared by forming the adhesive layer of the present disclosure on an adhesion-facilitated PET sheet (having a thickness of 125 μm) to produce an adhesive sheet, reciprocally moving a 2-kg roller on the adhesive sheet to press-bond the adhesive layer of the adhesive sheet to an alkali-free glass plate in an environment at 23° C. at 50%

RH, and allowing the resulting adhesive sheet to stand still in the environment at 23° C. at 50% RH for 30 minutes.

The adhesive layer of the present disclosure has an adhesive strength (α) of not less than 25 N/25 mm, preferably not less than 28 N/25 mm, particularly preferably not less than 30 N/25 mm, as measured by the method described above. The upper limit of the adhesive strength (α) is typically 100 N/25 mm, preferably 50 N/25 mm.

<Bending Durability (β)>

The bending durability (β) is defined as the number of times of bending during which no appearance change is observed when a repetitive bending test is performed, with the use of a test sample prepared by forming the adhesive layer of the present disclosure on an adhesion-facilitated PET sheet (having a thickness of 125 μm) to produce an adhesive sheet and reciprocally moving a roller on the adhesive sheet to press-bond the adhesive layer of the adhesive sheet to a transparent polyimide film (having a thickness of 50 μm) in an environment at 23° C. at 50% RH, by repeatedly bending the test sample at a rate of 40 times/minute to a bent state with the PET sheet of the test sample located inward and with opposed sheet portions of the test sample spaced a distance of 5 mm in the environment at 23° C. at 50% RH. The term "no appearance change" means that the adhesive layer, the transparent polyimide sheet, and the PET sheet are all free from cracking and white turbidity. The appearance change is visually observed.

The adhesive layer of the present disclosure typically has a bending durability (β) of not less than 100,000 times, preferably not less than 150,000 times, particularly preferably not less than 200,000 times, as measured by the method described above.

<Moist Heat Haze Resistance (γ)>

The moist heat haze resistance (γ) is defined as a difference between haze values measured before and after a moist heat test is performed in an environment at 60° C. at 90% RH for seven days (168 hours) with the use of a test piece prepared by forming the adhesive layer of the present disclosure on an adhesion-facilitated PET sheet (having a thickness of 125 μm) to produce an adhesive sheet, bonding the adhesive sheet to an alkali-free glass plate (having a thickness of 1.1 mm), and autoclaving the resulting adhesive sheet (at 50° C. at 0.5 MPa for 20 minutes), the difference being calculated from the following expression:

Haze value difference (%)=$H_2$−$H_1$ wherein $H_1$ is a haze value before the moist heat test, and $H_2$ is a haze value after the moist heat test.

The adhesive layer of the present disclosure has a moist heat haze resistance (γ) of not greater than 1.0%, preferably not greater than 0.8%, particularly preferably not greater than 0.5%, as measured by the method described above. The lower limit of the moist heat haze resistance (γ) is typically 0.1%.

In the present disclosure, the haze values are measured in conformity with JIS K7361-1 by means of a haze meter.

The adhesive layer formed by curing the adhesive composition [I] or the solvent-free adhesive composition [I] of the present disclosure is excellent in adhesive strength, bending durability, and moist heat haze resistance. The adhesive agent prepared by using the adhesive composition [I] or the solvent-free adhesive composition [I] is excellent in adhesive strength, bending durability, and moist heat haze resistance and, therefore, can be advantageously used for double-sided adhesive applications and as an adhesive agent having impact resistance and higher adhesiveness. Specifically, the adhesive agent prepared by using the adhesive composition [I] or the solvent-free adhesive composition [I] is useful as an adhesive component for bonding glass, ITO transparent electrode sheets, optical sheets such as of polyethylene terephthalate (PET), polycarbonate (PC), and polymethyl methacrylate (PMMA), polarizer plates, phase retardation plates, optical compensation films, brightness improving films, and other optical members. Further, the adhesive agent prepared by using the adhesive composition [I] or the solvent-free adhesive composition [I] can be advantageously used for image display devices such as touch panels including any of these optical members, particularly for touch panels and image display devices for foldable smartphones.

Further, the adhesive composition [I] and the solvent-free adhesive composition [I] of the present disclosure can also be used for adhesive agents for various labels or for adhesive agents for masking, and particularly advantageously used for electronic component applications and the like.

[Adhesive Layer Formed by Curing Adhesive Composition [II] or Solvent-Free Adhesive Composition [II]]

The adhesive strength of the adhesive layer of the adhesive sheet (the double-sided adhesive sheet, the adhesive layer-backed optical member) of the present disclosure produced by using the adhesive composition [II] or the solvent-free adhesive composition [II] is properly set according to the material or the like of an adherend. Where the adhesive sheet is bonded to a glass substrate, a polycarbonate plate, a polymethyl methacrylate plate, or a PET sheet having an ITO layer vapor-deposited thereon, for example, the adhesive layer preferably has an adhesive strength of 5 to 100 N/25 mm, particularly preferably 10 to 50 N/25 mm.

The adhesive strength is measured, for example, in the following manner. Where the adhesive strength of the adhesive layer of the substrateless double-sided adhesive sheet having polyester release sheets (PET sheets) provided on opposite sides of the adhesive layer is measured, one of the release sheets is removed from one side of the adhesive layer, and the adhesive layer is pressed onto a 125-μm thick adhesion-facilitated PET sheet, whereby an adhesive layer-backed PET sheet is produced. The adhesive layer-backed PET sheet is cut to a size of 25 mm (width)×100 mm (length). Then, the other release sheet is removed from the adhesive layer-backed PET sheet, and the adhesive layer is brought into intimate contact with the adherend and press-bonded to the adherend by reciprocally moving a 2-kg rubber roller on the adhesive layer-backed PET sheet twice in an atmosphere at 23° C. at 50% RH. The resulting adhesive layer-backed PET sheet is allowed to stand still for 30 minutes in the same atmosphere. Then, the 180-degree peel strength (N/25 mm) is measured at a peel rate of 300 mm/minute at an ordinary temperature (23° C.).

The adhesive layer preferably has a haze value of not greater than 2%, particularly preferably not greater than 1%, more preferably not greater than 0.5%. If the haze value is excessively great, the adhesive layer tends to be whitened, suffering from lower transparency.

The adhesive layer preferably has a color difference b* value of not greater than 1, particularly preferably not greater than 0.5. If the color difference b* value is excessively great, the transparency tends to be poorer. The lower limit of the color difference b* value is typically −1.

The color difference b* value is measured in conformity with JIS K7105 by means of a spectrophotometer under transmission conditions.

The adhesive layer preferably has a YI value of not greater than 2.0, particularly preferably not greater than 1.0, more preferably not greater than 0.5. If the YI value is excessively great, the transparency tends to be poorer.

The YI value is measured in conformity with JIS K7373 by means of a spectrophotometer under transmission conditions.

The haze value, the color difference b* value, and the YI value are measured with only the adhesive layer bonded to an alkali-free glass plate (having a total light transmittance of 93, a haze of 0.06, and a b* value of 0.16).

The adhesive composition [II] and the solvent-free adhesive composition [II] of the present disclosure are excellent in heat stability with a smaller viscosity increase due to heating, and ensure thick coatability. Further, the adhesive composition [II] and the solvent-free adhesive composition [II] have excellent adhesive strength to adherends, and yet are excellent in bending durability, particularly repetitive bending durability, reliability in a bent state, and moist heat haze resistance. Therefore, the adhesive agent prepared by using the adhesive composition [II] or the solvent-free adhesive composition [II] can be advantageously used for double-sided adhesive applications and as an adhesive agent having impact resistance and higher adhesiveness. Specifically, the adhesive agent prepared by using the adhesive composition [II] or the solvent-free adhesive composition [II] is useful as an adhesive component for bonding glass, ITO transparent electrode sheets, optical sheets such as of polyethylene terephthalate (PET), polycarbonate (PC), and polymethyl methacrylate (PMMA), polarizer plates, phase retardation plates, optical compensation films, brightness improving films, and other optical members. Further, the adhesive agent prepared by using the adhesive composition [II] or the solvent-free adhesive composition [II] can be advantageously used for image display devices such as touch panels including any of these optical members, particularly for touch panels and image display devices for foldable smartphones.

Further, the adhesive composition [II] and the solvent-free adhesive composition [II] of the present disclosure, and the adhesive agent prepared by using the adhesive composition [II] or the solvent-free adhesive composition [II] can also be used for an adhesive agent for various labels or for an adhesive agent for masking, and particularly advantageously used for electronic component applications and the like.

EXAMPLES

The embodiments of the present disclosure will be described more specifically by way of examples thereof. However, it should be understood that the present disclosure be not limited to these examples within the scope of the present disclosure.

In the following examples, "parts" and "%" are based on weight. The weight average molecular weight of each of the following acrylic resins was measured by the acrylic resin weight average molecular weight measurement method described above.

The glass transition temperature of each of the acrylic resins was measured in the following manner.

The proportions of structural units of each of the acrylic resins (after polymerization) are substantially the same as the proportions of monomers for the polymer.

Further, a glass transition temperature (Fox's formula) calculated from Fox's formula is also shown in Tables.

<Glass Transition Temperature of Acrylic Resin (Dynamic Viscoelasticity)>

An acrylic resin solution obtained before evaporation of a solvent was applied to a polyester release sheet and dried to form a layer, whereby an adhesive sheet having a thickness of about 650 μm was produced in an uncrosslinked state. The dynamic viscoelasticity of the adhesive sheet thus produced was measured under the following conditions. Then, a temperature at which the loss tangent ((loss elastic modulus G")/(storage elastic modulus G')=tan δ) was maximum was determined as the glass transition temperature (dynamic viscoelasticity) of the acrylic resin.

Measurement apparatus: DVA-225 (available from IT Measurement Control Co., Ltd.)
Deformation mode: Shear mode
Strain: 0.1%
Measurement temperature: −100° C. to 20° C.
Measurement frequency: 1 Hz Prior to implementation of Examples and Comparative Examples, the following acrylic resins were prepared.

Preparation of Acrylic Resins (1-1) to (1-8)

[Acrylic Resin (1-1)]

In a 2-L flask provided with a cooler, 24 parts of ethyl acetate (having a boiling point of 77° C.) as the polymerization solvent and 0.01 part of 2,2'-azobis(2,4-dimethylvaleronitrile) (ADVN having a half-life temperature of 52° C.) as the polymerization initiator were refluxed with heating. Then, a solution prepared by mixing 39.0 parts of 2-ethylhexyl acrylate (2EHA), 6.0 parts of methyl acrylate (MA), 6.0 parts of ethyl acrylate (EA), 9.0 parts of 2-hydroxyethyl acrylate (HEA), 6 parts of acetone, and 0.1 part of ADVN was added dropwise into the flask in 3 hours. After a lapse of 30 minutes from the dropwise addition of the solution, 0.1 part of ADVN was added dropwise into the flask in 1 hour. Thus, a reaction was allowed to proceed, whereby a solution of an acrylic resin (1-1) was prepared. The resulting acrylic resin (1-1) had a glass transition temperature (dynamic viscoelasticity) of −22° C. and a weight average molecular weight of 535,000.

[Acrylic Resins (1-2) to (1-6) and (1-8)]

Solutions of acrylic resins (1-2) to (1-6) and (1-8) were prepared by substantially the same method as the preparation method for the acrylic resin (1-1), except that the acrylic resins (1-2) to (1-6) and (1-8) respectively had polymerization components as shown in Table 1.

[Acrylic Resin (1-7)]

In a 2-L flask provided with a cooler, 37 parts of ethyl acetate (having a boiling point of 77° C.) and 63 parts of methyl ethyl ketone (having a boiling point of 80° C.) as the polymerization solvent and 0.3 parts of 2,2'-azobisisobutyronitrile (AIBN having a half-life temperature of 65° C.) as the polymerization initiator were refluxed with heating. Then, a solution prepared by mixing 100 parts of methyl methacrylate (MMA), 3 parts of ethyl acetate, and 0.3 parts of AIBN was added dropwise into the flask in 2 hours. After a lapse of 60 minutes from the dropwise addition of the solution, 0.2 parts of AIBN was added into the flask. Thus, a reaction was allowed to proceed, whereby a solution of an acrylic resin (1-7) was prepared. The resulting acrylic resin (1-7) had a weight average molecular weight of 47,000. It was impossible to measure the glass transition temperature (dynamic viscoelasticity) of the acrylic resin (1-7) by the aforementioned measurement method.

The monomer formulations (the structural units of the resulting polymer components), the weight average molecular weights, the glass transition temperatures (dynamic viscoelasticity values), and the Fox's formula calculation results of the acrylic resins (1-1) to (1-8) thus prepared are also shown below in Table 1.

TABLE 1

| | Acrylic resin | | | | | | | |
|---|---|---|---|---|---|---|---|---|
| | (1-1) | (1-2) | (1-3) | (1-4) | (1-5) | (1-6) | (1-7) | (1-8) |
| Monomer formulation (wt. %) | | | | | | | | |
| 2EHA | 65.0 | 67.5 | 67.5 | 60.0 | 65.0 | 65.0 | — | 65.0 |
| MA | 10.0 | 10.0 | 10.0 | 20.0 | 10.0 | — | — | — |
| EA | 10.0 | 5.0 | 5.0 | — | 10.0 | — | — | — |
| iBMA | — | — | — | — | — | 20.0 | — | — |
| MMA | — | — | — | — | — | — | 100 | 20.0 |
| HEA | 15.0 | 17.5 | 17.5 | 20.0 | 15.0 | 15.0 | — | 15.0 |
| Weight average molecular weight | 535,000 | 499,000 | 566,000 | 379,000 | 535,000 | 509,000 | 47,000 | 397,000 |
| Glass transition temperature Tg (° C.) (Dynamic viscoelasticity) | −22 | −20 | −20 | −15 | −22 | −17 | * | −9 |
| Glass transition temperature Tg (° C.) (Fox's formula) | −53 | −54 | −54 | −48 | −53 | −46 | 105 | −41 |

2EHA: 2-ethylhexyl acrylate, MA: methyl acrylate, EA: ethyl acrylate, iBMA: isobutyl methacrylate, MMA: methyl methacrylate, HEA: 2-hydroxyethyl acrylate
*Impossible to measure.

lar weights, the glass transition temperatures (dynamic viscoelasticity values), and the Fox's formula calculation results of the acrylic resins (2-1) to (2-9) thus prepared are also shown below in Table 2.

TABLE 2

| | Acrylic resin | | | | | | | | |
|---|---|---|---|---|---|---|---|---|---|
| | (2-1) | (2-2) | (2-3) | (2-4) | (2-5) | (2-6) | (2-7) | (2-8) | (2-9) |
| Monomer formulation (wt. %) | | | | | | | | | |
| 2EHA | 65.0 | 65.0 | 65.0 | 65.0 | 55.0 | 65.0 | 65.0 | 55.0 | 85.0 |
| EA | 20.0 | 17.5 | 15.0 | 20.0 | 30.0 | 17.5 | 20.0 | 30.0 | — |
| HEA | 10.0 | 10.0 | 10.0 | 15.0 | — | 10.0 | 10.0 | — | — |
| 4HBA | 5.0 | 7.5 | 10.0 | — | 15.0 | 7.5 | 5.0 | 15.0 | 15.0 |
| Weight average molecular weight | 562,000 | 505,000 | 593,000 | 544,000 | 588,000 | 639,000 | 622,000 | 588,000 | 638,000 |
| Glass transition temperature Tg (° C.) (Dynamic viscoelasticity) | −28 | −25 | −26 | −26 | −27 | −25 | −28 | −27 | −34 |
| Glass transition temperature Tg (° C.) (Fox's formula) | −55 | −56 | −56 | −55 | −52 | −56 | −55 | −52 | −65 |

2EHA: 2-ethylhexyl acrylate, EA: ethyl acrylate, HEA: 2-hydroxyethyl acrylate, 4HBA: 4-hydroxybutyl acrylate <Preparation of Acrylic Resins (2-1) to (2-9)>

[Acrylic Resin (2-1)]

In a 2-L flask provided with a cooler, 24 parts of ethyl acetate (having a boiling point of 77° C.) as the polymerization solvent and 0.01 part of 2,2'-azobis(2,4-dimethylvaleronitrile) (ADVN having a half-life temperature of 52° C.) as the polymerization initiator were refluxed with heating. Then, a solution prepared by mixing 39.0 parts of 2-ethylhexyl acrylate (2EHA), 12.0 parts of ethyl acrylate (EA), 6.0 parts of 2-hydroxyethyl acrylate (HEA), 3.0 parts of 4-hydroxybutyl acrylate (4HBA), 6 parts of acetone, and 0.6 parts of ADVN was added dropwise into the flask in 3 hours. After a lapse of 30 minutes from the dropwise addition of the solution, 0.1 part of ADVN was added dropwise into the flask in 1 hour. Thus, a reaction was allowed to proceed, whereby a solution of an acrylic resin (2-1) was prepared. The resulting acrylic resin (2-1) had a glass transition temperature (dynamic viscoelasticity) of −28° C. and a weight average molecular weight of 562,000.

[Acrylic Resins (2-2) to (2-9)]

Solutions of acrylic resins (2-2) to (2-9) were prepared by substantially the same method as the preparation method for the acrylic resin (2-1), except that the acrylic resins (2-2) to (2-9) respectively had polymerization components as shown in Table 2.

The monomer formulations (the structural units of the resulting polymer components), the weight average molecu- Adhesive compositions [I] of Examples and Comparative Examples were prepared by using the acrylic resins (1-1) to (1-4), (1-7), and (1-8) and the acrylic resins (2-1) to (2-6), and (2-9).

Adhesive Compositions [I]

Example 1

A solution of an acrylic resin (X-1) was prepared by mixing the solution of the acrylic resin (1-1) (having a solid content of 60 parts) and the solution of the acrylic resin (2-1) (having a solid content of 40 parts). A difference in glass transition temperature between the acrylic resin (1-1) and the acrylic resin (2-1) in the acrylic resin (X-1) was 6° C. The acrylic resin (X-1) had a glass transition temperature (dynamic viscoelasticity) of −23° C.

Then, the solution of the acrylic resin (X-1) was put in a flask provided with a reflux extraction tube for removal of the solvent to the outside of the flask. The solvent was evaporated away from the solution of the acrylic resin (X-1) at 90° C. for 1 hour and then at 90° C. at a reduced pressure of 10 kPa for 2 hours.

An adhesive composition [I-1] was prepared by mixing 0.25 parts of OMNIRAD 184 (available from IGM Resins B. V.) and 0.5 parts of OMNIRAD 754 (available from IGM Resins B. V.) as the polymerization initiator and 5 parts of trimethylolpropane triacrylate (polyfunctional monomer) with 100 parts of the acrylic resin (X-1) from which the solvent was evaporated away.

Example 2

A solution of an acrylic resin (X-2) was prepared by mixing the solution of the acrylic resin (1-2) (having a solid content of 55 parts) and the solution of the acrylic resin (2-2) (having a solid content of 45 parts). A difference in glass transition temperature between the acrylic resin (1-2) and the acrylic resin (2-2) in the acrylic resin (X-2) was 5° C. The acrylic resin (X-2) had a glass transition temperature (dynamic viscoelasticity) of −23° C.

Then, the solvent was evaporated away from the solution of the acrylic resin (X-2) in the same manner as in Example 1.

An adhesive composition [I-2] was prepared by mixing 0.25 parts of OMNIRAD 184 (available from IGM Resins B. V.) and 0.25 parts of benzophenone as the polymerization initiator and 5 parts of trimethylolpropane triacrylate (polyfunctional monomer) with 100 parts of the acrylic resin (X-2) from which the solvent was evaporated away.

Example 3

A solution of an acrylic resin (X-3) was prepared by mixing the solution of the acrylic resin (1-3) (having a solid content of 55 parts) and the solution of the acrylic resin (2-3) (having a solid content of 45 parts). A difference in glass transition temperature between the acrylic resin (1-3) and the acrylic resin (2-3) in the acrylic resin (X-3) was 6° C. The acrylic resin (X-3) had a glass transition temperature (dynamic viscoelasticity) of −22° C.

Then, the solvent was evaporated away from the solution of the acrylic resin (X-3) in the same manner as in Example 1.

An adhesive composition [I-3] was prepared by mixing 0.25 parts of OMNIRAD 184 (available from IGM Resins B. V.) and 0.5 parts of OMNIRAD 754 (available from IGM Resins B. V.) as the polymerization initiator and 5 parts of trimethylolpropane triacrylate (polyfunctional monomer) with 100 parts of the acrylic resin (X-3) from which the solvent was evaporated away.

Example 4

A solution of an acrylic resin (X-4) was prepared by mixing the solution of the acrylic resin (1-1) (having a solid content of 60 parts) and the solution of the acrylic resin (2-4) (having a solid content of 40 parts). A difference in glass transition temperature between the acrylic resin (1-1) and the acrylic resin (2-4) in the acrylic resin (X-4) was 4° C. The acrylic resin (X-4) had a glass transition temperature (dynamic viscoelasticity) of −22° C.

Then, the solvent was evaporated away from the solution of the acrylic resin (X-4) in the same manner as in Example 1.

An adhesive composition [I-4] was prepared by mixing 0.25 parts of OMNIRAD 184 (available from IGM Resins B. V.) and 0.5 parts of OMNIRAD 754 (available from IGM Resins B. V.) as the polymerization initiator and 5 parts of trimethylolpropane triacrylate (polyfunctional monomer) with 100 parts of the acrylic resin (X-4) from which the solvent was evaporated away.

Comparative Example 1

The solvent was evaporated away from the solution of the acrylic resin (1-1) in the same manner as in Example 1.

An adhesive composition [I'-1] was prepared by mixing 0.5 parts of OMNIRAD 754 (available from IGM Resins B. V.) as the polymerization initiator and 5 parts of trimethylolpropane triacrylate (polyfunctional monomer) with 100 parts of the acrylic resin (1-1) from which the solvent was evaporated away.

Comparative Example 2

The solvent was evaporated away from the solution of the acrylic resin (1-4) in the same manner as in Example 1.

An adhesive composition [I'-2] was prepared by mixing 0.5 parts of OMNIRAD 754 (available from IGM Resins B. V.) as the polymerization initiator and 5 parts of trimethylolpropane triacrylate (polyfunctional monomer) with 100 parts of the acrylic resin (1-4) from which the solvent was evaporated away.

Comparative Example 3

The solvent was evaporated away from the solution of the acrylic resin (2-5) in the same manner as in Example 1.

An adhesive composition [I'-3] was prepared by mixing 0.25 parts of OMNIRAD 184 (available from IGM Resins B. V.) and 0.25 parts of OMNIRAD 754 (available from IGM Resins B. V.) as the polymerization initiator and 5 parts of trimethylolpropane triacrylate (polyfunctional monomer) with 100 parts of the acrylic resin (2-5) from which the solvent was evaporated away.

Comparative Example 4

A solution of an acrylic resin (X'-1) was prepared by mixing the solution of the acrylic resin (1-7) (having a solid content of 10 parts) and the solution of the acrylic resin (2-6) (having a solid content of 90 parts).

Then, the solvent was evaporated away from the solution of the acrylic resin (X'-1).

An adhesive composition [I'-4] was prepared by mixing 0.25 parts of OMNIRAD 184 (available from IGM Resins B. V.) and 0.75 parts of OMNIRAD 754 (available from IGM Resins B. V.) as the polymerization initiator and 10 parts of trimethylolpropane triacrylate (polyfunctional monomer) with 100 parts of the acrylic resin (X'-1) from which the solvent was evaporated away.

Comparative Example 5

A solution of an acrylic resin (X'-2) was prepared by mixing the solution of the acrylic resin (1-8) (having a solid content of 60 parts) and the solution of the acrylic resin (2-9) (having a solid content of 40 parts).

Then, the solvent was evaporated away from the solution of the acrylic resin (X'-2).

An adhesive composition [I'-5] was prepared by mixing 0.25 parts of OMNIRAD 184 (available from IGM Resins B. V.) and 0.5 parts of OMNIRAD 754 (available from IGM Resins B. V.) as the polymerization initiator and 5 parts of trimethylolpropane triacrylate (polyfunctional monomer) with 100 parts of the acrylic resin (X'-2) from which the solvent was evaporated away.

The formulations of the adhesive compositions [I-1] to [I-4] of Examples 1 to 4 and the adhesive compositions [I'-1] to [I'-5] of Comparative Examples 1 to 5 thus prepared are shown below in Table 3.

content of 55 parts) and the solution of the acrylic resin (2-2) (having a solid content of 45 parts). A difference in glass transition temperature between the acrylic resin (1-3) and the acrylic resin (2-2) in the acrylic resin (Y-2) was 5° C. The

TABLE 3

|  |  | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|
| Adhesive Composition |
| Acrylic resin |
| Acrylic resin (X1) | Type | 1-1 | 1-2 | 1-3 | 1-1 | 1-1 | 1-4 | — | 1-7 | 1-8 |
|  | Proportion (parts) | 60 | 55 | 55 | 60 | 100 | 100 | — | 10 | 60 |
| Acrylic resin (X2) | Type | 2-1 | 2-2 | 2-3 | 2-4 | — | — | 2-5 | 2-6 | 2-9 |
|  | Proportion (parts) | 40 | 45 | 45 | 40 | — | — | 100 | 90 | 40 |
| Glass transition temperature Tg (° C.) |  | −23 | −23 | −22 | −22 | −22 | −15 | −27 | — | — |
| Difference in glass transition temperature (° C.) |  | 6 | 5 | 6 | 4 | — | — | — | — | 25 |
| Polyfunctional monomer TMPTA (parts) |  | 5 | 5 | 5 | 5 | 5 | 5 | 5 | 10 | 5 |
| Photopolymerization initiator |
| OMNIRAD 184 (parts) |  | 0.25 | 0.25 | 0.25 | 0.25 | — | — | 0.25 | 0.25 | 0.25 |
| Benzophenone (parts) |  | — | 0.25 | — | — | — | — | — | — | — |
| OMNIRAD 754 (parts) |  | 0.5 | — | 0.5 | 0.5 | 0.5 | 0.5 | 0.25 | 0.75 | 0.5 |

TMPTA: trimethylolpropane triacrylate

Adhesive compositions [II] of Examples and Comparative Examples were prepared by using the acrylic resins (1-3), (1-5), and (1-6), and the acrylic resins (2-2), (2-3), (2-7), and (2-8).

[Adhesive Compositions [II]]

Example 5

A solution of an acrylic resin (Y-1) was prepared by mixing the solution of the acrylic resin (1-5) (having a solid content of 60 parts) and the solution of the acrylic resin (2-7) (having a solid content of 40 parts). A difference in glass transition temperature between the acrylic resin (1-5) and the acrylic resin (2-7) in the acrylic resin (Y-1) was 6° C. The acrylic resin (Y-1) had a glass transition temperature (dynamic viscoelasticity) of −23° C.

Then, a mixture prepared by mixing the solution of the acrylic resin (Y-1) and 0.5 parts of bis(2,6-diisopropylphenyl)carbodiimide as the carbodiimide compound based on a solid content of 100 parts of the solution of the acrylic resin (Y-1) was put in a flask provided with a reflux extraction tube for removal of the solvent to the outside of the flask. The solvent was evaporated away from the mixture at 90° C. for 1 hour and then at 90° C. at a reduced pressure of 10 kPa for 2 hours.

A composition of the acrylic resin (Y-1) from which the solvent was evaporated away had an acid value of 0.08 mg KOH/g. An adhesive composition [II-1] was prepared by mixing 0.25 parts of OMNIRAD 184 (available from IGM Resins B. V.) and 0.5 parts of OMNIRAD 754 (available from IGM Resins B. V.) as the polymerization initiator and 5 parts of trimethylolpropane triacrylate as the polyfunctional monomer with 100 parts of the resulting composition of the acrylic resin (Y-1).

Example 6

A solution of an acrylic resin (Y-2) was prepared by mixing the solution of the acrylic resin (1-3) (having a solid acrylic resin (Y-2) had a glass transition temperature (dynamic viscoelasticity) of −23° C.

Then, a composition of the acrylic resin (Y-2) was prepared in substantially the same manner as in Example 5 by evaporating away the solvent, except that the proportion of bis(2,6-diisopropylphenyl) carbodiimide was 0.6 parts based on a solid content of 100 parts of the solution of the acrylic resin (Y-2). The composition of the acrylic resin (Y-2) thus prepared had an acid value of 0.06 mg KOH/g. An adhesive composition [II-2] was prepared in substantially the same manner as in Example 5, except that the composition of the acrylic resin (Y-2) was used.

Example 7

A solution of an acrylic resin (Y-3) was prepared by mixing the solution of the acrylic resin (1-6) (having a solid content of 55 parts) and the solution of the acrylic resin (2-3) (having a solid content of 45 parts). A difference in glass transition temperature between the acrylic resin (1-6) and the acrylic resin (2-3) in the acrylic resin (Y-3) was 6° C. The acrylic resin (Y-3) had a glass transition temperature (dynamic viscoelasticity) of −22° C.

Then, a composition of the acrylic resin (Y-3) was prepared in substantially the same manner as in Example 5 by evaporating away the solvent, except that the proportion of bis(2,6-diisopropylphenyl)carbodiimide was 0.75 parts based on a solid content of 100 parts of the solution of the acrylic resin (Y-3). The composition of the acrylic resin (Y-3) thus prepared had an acid value of 0.07 mg KOH/g. An adhesive composition [II-3] was prepared in substantially the same manner as in Example 5, except that the composition of the acrylic resin (Y-3) was used.

Comparative Example 6

The solvent was evaporated away from the solution of the acrylic resin (1-6) in substantially the same manner as in Example 5. The acrylic resin (1-6) from which the solvent was evaporated away had an acid value of 0.31 mg KOH/g.

An adhesive composition [II'-1] was prepared by mixing 0.25 parts of OMNIRAD 184 (available from IGM Resins B. V.) and 0.5 parts of OMNIRAD 754 (available from IGM Resins B. V.) as the polymerization initiator and 5 parts of trimethylolpropane triacrylate as the polyfunctional monomer with 100 parts of the acrylic resin (1-6) from which the solvent was evaporated away.

Comparative Examples 7

The solvent was evaporated away from the solution of the acrylic resin (2-8) in substantially the same manner as in Example 5. The acrylic resin (2-8) from which the solvent was evaporated away had an acid value of 0.06 mg KOH/g.

An adhesive composition [II'-2] was prepared by mixing 0.25 parts of OMNIRAD 184 (available from IGM Resins B. V.) and 0.25 parts of OMNIRAD 754 (available from IGM Resins B. V.) as the polymerization initiator and 5 parts of trimethylolpropane triacrylate as the polyfunctional monomer with 100 parts of the acrylic resin (2-8) from which the solvent was evaporated away.

The formulations of the adhesive compositions [II-1] to [II-3] of Examples 5 to 7 and the adhesive compositions [II'-1] and [II'-2] of Comparative Examples 6 and 7 are shown below in Table 4.

TABLE 4

|  |  | Example 5 | Example 6 | Example 7 | Comparative Example 6 | Comparative Example 7 |
|---|---|---|---|---|---|---|
| Adhesive Composition | | | | | | |
| Acrylic resin | | | | | | |
| Acrylic resin (Y1) | Type | 1-5 | 1-3 | 1-6 | 1-6 | — |
|  | Proportion (parts) | 60 | 55 | 55 | 100 | — |
| Acrylic resin (Y2) | Type | 2-7 | 2-2 | 2-3 | — | 2-8 |
|  | Proportion (parts) | 40 | 45 | 45 | — | 100 |
| Glass transition temperature Tg (° C.) | | −23 | −23 | −22 | −17 | −27 |
| Difference in glass transition temperature (° C.) | | 6 | 5 | 6 | — | — |
| Carbodiimide compound DIPC (parts) | | 0.5 | 0.6 | 0.75 | — | — |
| Polyfunctional monomer TMPTA (parts) | | 5 | 5 | 5 | 5 | 5 |
| Photopolymerization initiator | | | | | | |
| OMNIRAD 184 (parts) | | 0.25 | 0.25 | 0.25 | 0.25 | 0.25 |
| OMNIRAD 754 (parts) | | 0.5 | 0.5 | 0.5 | 0.5 | 0.25 |
| Acid value (mg KOH/g) | | 0.08 | 0.06 | 0.07 | 0.31 | 0.06 |

DIPC: bis(2,6-diisopropylphenyl) carbodiimide, TMPTA: trimethylolpropane triacrylate Substrateless double-sided adhesive sheets and adhesive layer-backed PET sheets were produced in the following manner by using the adhesive compositions of Examples 1 to 7 and Comparative Examples 1 to 7 prepared in the aforementioned manner.
<Production of Substrateless Double-Sided Adhesive Sheets, Adhesive Layer-Backed PET Sheets, and Adhesive Layer-Backed COP Sheets>

The adhesive compositions prepared in the aforementioned manner were each sandwiched between polyester release sheets (each having a thickness of 176 μm). Then, the resulting laminate was heat-pressed at 100° C. to an adhesive layer thickness of 160 μm, and irradiated with ultraviolet radiation with a peak illuminance of 150 mW/cm$^2$ with a cumulative exposure dose of 1,000 mJ/cm$^2$ (with 500 mJ/cm$^2$ twice) by means of a high-pressure mercury ultraviolet irradiation apparatus. Thus, substrateless double-sided adhesive sheets were produced. In this case, the adhesive compositions each served as an adhesive agent.

Further, adhesive layer-backed PET sheets each having a 160-μm thick adhesive layer were each produced by removing one of the release sheets from one side of the adhesive layer of each of the substrateless double-sided adhesive sheets produced in the aforementioned manner, and pressing the resulting substrateless double-sided adhesive sheet on an adhesion-facilitated polyethylene terephthalate (PET) sheet (having a thickness of 125 μm).

Further, adhesive layer-backed COP sheets each having a 160-μm thick adhesive layer were each produced by removing one of the release sheets from one side of the adhesive layer of each of the substrateless double-sided adhesive sheets produced in the aforementioned manner by using the adhesive compositions [II] of Examples 5 to 7 and the adhesive compositions [II'] of Comparative Examples 6 and 7, and pressing the resulting substrateless double-sided adhesive sheet on a cycloolefin polymer (COP) sheet (having a thickness of 50 μm).

The substrateless double-sided adhesive sheets of Examples 1 to 7 and Comparative Examples 1 to 7 were evaluated for gel fraction. The results are shown below in Tables 5 and 6.
[Gel Fraction]

The substrateless double-sided adhesive sheets were each cut to a size of 40 mm×40 mm, then irradiated with ultraviolet radiation with a peak illuminance of 150 mW/cm$^2$ with a cumulative exposure dose of 2,000 mJ/cm$^2$ (with 1,000 mJ/cm$^2$ twice) by means of a high-pressure mercury ultraviolet irradiation apparatus, and allowed to stand still at 23° C. at 50% RH for 30 minutes. Thereafter, one of the release sheets was removed from the adhesive layer, and the adhesive layer was bonded to a stainless steel (JIS SUS) mesh sheet (200 mesh) having a size of 50 mm×100 mm. Then, the other release sheet was removed from the adhesive layer, and the stainless steel mesh sheet was folded along a longitudinally middle portion thereof, whereby the resulting sample was wrapped with the stainless steel mesh sheet. After the sample wrapped with the mesh sheet was immersed in 250 g of toluene contained in a sealed container for 24 hours, the weight percentage of a portion of the adhesive layer left undissolved in the stainless steel mesh sheet to the weight of the adhesive layer before the immersion in toluene was determined as the gel fraction (%).

The adhesive layer-backed PET sheets respectively having the adhesive layers formed from the adhesive compositions of Examples 1 to 7 and Comparative Examples 1 to 3, 6 and 7 were each evaluated for the gel fraction, the adhesive strength, the bending durability, and the moist heat haze resistance. The results are shown below in Tables and 6.

The adhesive layer-backed PET sheets respectively having the adhesive layers formed from the adhesive compositions of Comparative Examples 4 and 5 were each evaluated for only the gel fraction and the haze value before a moist heat resistance test because of poorer compatibility.

[Adhesive Strength]

The adhesive layer-backed PET sheets were each cut to a size of 25 mm (width)×100 mm (length), and irradiated with ultraviolet radiation with a peak illuminance of 150 mW/cm$^2$ with a cumulative exposure dose of 2,000 mJ/cm$^2$ (with 1,000 mJ/cm$^2$ twice) by means of a high-pressure mercury ultraviolet irradiation apparatus. Thereafter, the release sheet was removed from the adhesive layer, and the adhesive layer was press-bonded to an alkali-free glass plate (EAGLE XG having a thickness of 1.1 mm and available from Corning Inc.) by reciprocally moving a 2-kg rubber roller on the adhesive layer-backed PET sheet twice in an atmosphere at 23° C. at 50% RH, and allowed to stand still for 30 minutes in the atmosphere at 23° C. at 50% RH. Then, the 180-degree peel strength (N/25 mm) was measured at a peel rate of 300 mm/minute at an ordinary temperature (23° C.).

[Bending Durability]
<Repetitive Bending Durability>

Test pieces each having a layered structure of PET sheet/adhesive layer/polyimide sheet were respectively prepared by bringing the adhesive layers of the adhesive layer-backed PET sheets into press contact with transparent polyimide sheets (each having a thickness of 50 μm) in an environment at 23° C. at 50% RH.

Thereafter, the test pieces were each irradiated with ultraviolet radiation from the PET sheet side with a peak illuminance of 150 mW/cm$^2$ with a cumulative exposure dose of 2,000 mJ/cm$^2$ (with 1,000 mJ/cm$^2$ twice) by means of a high-pressure mercury ultraviolet irradiation apparatus. Then, the resulting test pieces were each cut to a size of 10 mm (width)×120 mm (length), and a repetitive bending test was performed in the following manner.

The repetitive bending test was performed in the environment at 23° C. at 50% RH under the following test conditions by bending the test piece with the PET sheet located inward.

[Test Conditions]

Test apparatus: Planar object tension-free U-shape stretch tester DLDM111LH (available from Yuasa System Co., Ltd.)

Bending rate: 40 times/minute

Bending diameter: 5 mm

In the repetitive bending test, the number of times of bending was determined during which no appearance change was visually observed. The test pieces were each evaluated based on the following criteria. The expression "no appearance change" means that the adhesive layer is free from white turbidity and foaming, and the transparent polyimide sheet and the PET sheet are free from cracking, breakage, and white turbidity.

∘∘ (excellent): Not less than 200,000 times

∘ (acceptable): Not less than 100,000 times and less than 200,000 times

× (Unacceptable): Less than 100,000 times

Further, the adhesive layer-backed PET sheets respectively having adhesive layers formed from the adhesive composition [II] of Example 5 and the adhesive compositions [II'] of Comparative Examples 6 and 7 were evaluated for reliability in a bent state in the following manner.

<Reliability in Bent State>

Test pieces each having a layered structure of PET sheet/adhesive layer/polyimide sheet were respectively prepared by bringing the adhesive layers of the adhesive layer-backed PET sheets into press contact with transparent polyimide sheets (each having a thickness of 50 μm) in an environment at 23° C. at 50% RH.

Thereafter, the test pieces were each irradiated with ultraviolet radiation from the PET sheet side with a peak illuminance of 150 mW/cm$^2$ with a cumulative exposure dose of 2,000 mJ/cm$^2$ (with 1,000 mJ/cm$^2$ twice) by means of a high-pressure mercury ultraviolet irradiation apparatus. Then, the resulting test pieces were each cut to a size of 30 mm (width)×120 mm (length), and bonded to an aluminum plate (having a thickness of 0.3 mm) with a double-sided tape. The resulting test pieces were each bent to a diameter of 3 mm by means of a mandrel tester and, in this state, fixed. The test pieces thus prepared as each having a structure of PET sheet/adhesive layer/polyimide sheet/aluminum plate were bent with the aluminum plate located inward.

After a durability test was performed on the resulting test pieces in a dry atmosphere at 105° C. for 150 hours, the test pieces were each visually checked for appearance change.

As a result of the reliability evaluation performed in the bent state, the adhesive layer-backed PET sheets of Example 5 and Comparative Example 6 were highly reliable without any appearance change, and the adhesive layer-backed PET sheet of Comparative Example 7 suffered from lifting and separation.

[Moist Heat Haze Resistance (Structure of Glass Plate/Adhesive Layer/PET Sheet)]

The adhesive layer-backed PET sheets were each cut to a size of 30 mm (width)×50 mm (length), and irradiated with ultraviolet radiation with a peak illuminance of 150 mW/cm$^2$ with a cumulative exposure dose of 2,000 mJ/cm$^2$ (with 1,000 mJ/cm$^2$ twice) by means of a high-pressure mercury ultraviolet irradiation apparatus. Thereafter, the release sheet was removed from the adhesive layer, and the adhesive layer was bonded to an alkali-free glass plate (EAGLE XG having a thickness of 1.1 mm and available from Corning Inc.) Then, the resulting laminate was autoclaved (at 50° C. at 0.5 MPa for 20 minutes), and allowed to stand still for 30 minutes in the atmosphere at 23° C. at 50% RH. Thus, test pieces each having a structure of glass plate/adhesive layer/PET sheet were prepared.

A moist heat resistance test was performed on the test pieces thus prepared in an atmosphere at 60° C. at 90% RH for seven days (168 hours), and haze values were measured before the start of the moist heat resistance test and immediately after the moist heat resistance test. The haze values are each determined by measuring a diffuse transmittance and a total light transmittance by means of a haze meter NDH2000 (available from Nippon Denshoku Industries Co., Ltd.) and putting measured values of the diffuse transmittance (DT) and the total light transmittance (TT) into the following expression (2). Then, a difference between the haze values was calculated from the following expression (3). The haze meter conforms with JIS K7361-1.

$$\text{Haze value (\%)} = (DT/TT) \times 100 \tag{2}$$

$$\text{Haze value difference (\%)} = H_2 - H_1 \tag{3}$$

wherein $H_1$ is the haze value before the start of the moist heat resistance test, and $H_2$ is the haze value immediately after the moist heat resistance test.

[Moist Heat Haze Resistance (Structure of Glass Plate/Adhesive Layer/COP Sheet)]

Test pieces each having a structure of glass plate/adhesive layer/COP sheet were prepared in substantially the same manner as described above from the adhesive layer-backed COP sheets respectively having adhesive layers formed by using the adhesive compositions [II] of Examples 5 to 7 and the adhesive compositions [II'] of Comparative Examples 6 and 7.

A moist heat resistance test was performed on the test pieces thus prepared in an atmosphere at 60° C. at 90% RH for seven days (168 hours). Before the start of the moist heat resistance test and after the moist heat resistance test, the resulting test pieces were allowed to stand still at 23° C. at 50% RH for two hours, and then haze values were measured. The haze values were each determined by measuring a diffuse transmittance and a total light transmittance by means of a haze meter NDH2000 (available from Nippon Denshoku Industries Co., Ltd.) and putting the measured values of the diffuse transmittance (DT) and the total light transmittance (TT) into the above expression (2). Then, a haze value increase rate was calculated from the following expression (4):

$$\text{Haze value increase rate (\%)} = [(H_2 - H_1)/H_1] \times 100 \quad (4)$$

wherein $H_1$ is the haze value before the start of the moist heat resistance test, and $H_2$ is the haze value immediately after the moist heat resistance test.

(Evaluation Criteria)
○○ (excellent): Increase rate was less than 100%
○ (acceptable): Increase rate was 100% to 500%
× (unacceptable): Increase rate was greater than 500%

TABLE 5

|  | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| Gel fraction (%) | 60.9 | 63.4 | 63.1 | 58.5 | 56.0 | 48.0 | 64.0 | 73.3 | 59.0 |
| Adhesive strength (N/25 mm) | 31.5 | 32.9 | 32.1 | 38.5 | 46.4 | 73.7 | 23.5 | — | — |
| Bending durability | ○○ | ○ | ○○ | ○○ | × | × | ○ | — | — |
| Moist heat haze resistance (Structure of glass plate/adhesive layer/PET sheet) | | | | | | | | | |
| Before haze test (%) | 0.3 | 0.3 | 0.3 | 0.3 | 0.4 | 0.4 | 0.2 | 33.3 | 16.4 |
| After haze test (%) | 0.7 | 0.6 | 0.6 | 0.5 | 0.7 | 0.8 | 0.6 | — | — |
| Haze difference (%) | 0.4 | 0.3 | 0.3 | 0.2 | 0.3 | 0.4 | 0.4 | — | — |

As can be understood from Table 5, the adhesive strength, the bending durability, and the moist heat haze resistance were all excellent in a properly balanced manner in Examples 1 to 4.

On the other hand, not all the adhesive strength, the bending durability, and the moist heat haze resistance were excellent in a properly balanced manner in Comparative Examples 1 to 3. Further, the transparency was poorer due to poorer compatibility in Comparative Examples 4 and 5.

TABLE 6

|  | Example 5 | Example 6 | Example 7 | Comparative Example 6 | Comparative Example 7 |
|---|---|---|---|---|---|
| Resin heat resistance | | | | | |
| M1*[1] (Pa·s) | 294 | 238 | 306 | 346 | 411 |
| M2*[2] (Pa·s) | 319 | 253 | 335 | 404 | 446 |
| Change rate M (%) | 8.4 | 6.3 | 9.7 | 16.8 | 8.5 |
| Evaluation | ○ | ○ | ○ | × | ○ |
| Gel fraction (%) | 65.2 | 65.3 | 67.1 | 63.1 | 64.0 |
| Adhesive strength (N/25 mm) | 29.2 | 33.5 | 29.8 | 36.7 | 23.5 |
| Repetitive bending durability | ○○ | ○○ | ○○ | × | ○ |
| Moist heat haze resistance (Structure of glass plate/adhesive layer/PET sheet) | | | | | |
| Before haze test (%) | 0.3 | 0.3 | 0.2 | 0.3 | 0.2 |
| After haze test (%) | 0.5 | 0.5 | 0.4 | 0.6 | 0.4 |
| Haze increase rate (%) | 104 | 65 | 83 | 97 | 79 |
| Evaluation | ○ | ○ | ○ | ○ | ○ |
| Moist heat haze resistance (Structure of glass plate/adhesive layer/COP sheet) | | | | | |
| Before haze test (%) | 0.10 | 0.07 | 0.02 | 0.14 | 0.06 |
| After haze test (%) | 0.23 | 0.12 | 0.07 | 0.23 | 0.49 |
| Haze increase rate (%) | 130 | 71 | 250 | 64 | 717 |
| Evaluation | ○ | ○○ | ○ | ○○ | × |

*[1]Melt viscosity of solvent-free adhesive composition at 130° C. before heat treatment
*[2]Melt viscosity of solvent-free adhesive composition at 130° C. after heat treatment at 130° C. for 3 hours As can be understood from Table 6, the heat stability was excellent with a smaller viscosity increase due to the heating, and the thick coatability was ensured in Examples 5 to 7. Further, the adhesive strength to adherends was excellent, and yet the bending durability and the moist heat haze resistance were excellent.

On the other hand, not all these evaluation items were excellent in a properly balanced manner in Comparative Examples 6 and 7.

While specific forms of the embodiments of the present disclosure have been shown in the aforementioned examples, the examples are merely illustrative but not limitative. It is contemplated that various modifications apparent to those skilled in the art could be made within the scope of the disclosure.

The adhesive layers and the adhesive compositions for formation of the adhesive layers according to the present disclosure are excellent in adhesive strength, bending durability, and moist heat haze resistance and, therefore, are advantageously usable for touch panels, image display apparatuses, impact-absorbing sheets, and the like.

The invention claimed is:

1. An adhesive layer formed by curing an adhesive composition [I] comprising an acrylic resin (X), the acrylic resin (X) comprising at least a highest-glass transition temperature acrylic resin (X1), and a lowest-glass transition temperature acrylic resin (X2), each of acrylic resins (X1) and (X2) comprising a hydroxyl-containing monomer (a1), at least one copolymerizable monomer (a2) selected from the group consisting of a vinyl ester monomer and an alkyl (meth)acrylate monomer having a C5 to C14 alkyl group, and at least one copolymerizable monomer (a3) selected from the group consisting of a vinyl ester monomer and an alkyl (meth)acrylate monomer having a C1 to C4 alkyl group,
   wherein, for at least one of acrylic resins (X1) and (X2):
      a proportion of the monomer (a1) is 5 to 60 wt. % based on a weight of overall copolymerization component of the at least one acrylic resins (X1) and (X2),
      a proportion of the monomer (a2) is 15 to 90 wt. % based on a weight of overall copolymerization component of the at least one acrylic resins (X1) and (X2), and
      a proportion of the monomer (a3) is 5 to 60 wt. % based on a weight of overall copolymerization component of the at least one acrylic resins (X1) and (X2),
   wherein the acrylic resins (X1) and (X2) have different glass transition temperatures and each respectively has a weight average molecular weight of not less than 10,000,
   wherein the acrylic resin (X) has a glass transition temperature ($T_X$) of not higher than −20° C. as measured as a temperature at which a loss tangent of a dynamic viscoelasticity thereof is maximum, and
   wherein a temperature difference between a glass transition temperature (Tx1) of the acrylic resin (X1) and a glass transition temperature (Tx2) of the acrylic resin (X2) is not greater than 20° C., and
   wherein at least one of the following conditions is satisfied:
      (i) the glass transition temperature Tx is −25° C. to −10° C. as measured as a temperature at which a loss tangent of a dynamic viscoelasticity thereof is maximum, and
      (ii) the glass transition temperature Tx2 is −35° C. to −20° C. as measured as a temperature at which a loss tangent of a dynamic viscoelasticity thereof is maximum.

2. An adhesive composition [I] comprising an acrylic resin (X), the acrylic resin (X) comprising at least a highest-glass transition temperature acrylic resin (X1), and a lowest-glass transition temperature acrylic resin (X2), each of acrylic resins (X1) and (X2) comprising a hydroxyl-containing monomer (a1), at least one copolymerizable monomer (a2) selected from the group consisting of a vinyl ester monomer and an alkyl (meth)acrylate monomer having a C5 to C14 alkyl group, and at least one copolymerizable monomer (a3) selected from the group consisting of a vinyl ester monomer and an alkyl (meth)acrylate monomer having a C1 to C4 alkyl group,
   wherein, for at least one of acrylic resins (X1) and (X2):
      a proportion of the monomer (a1) is 5 to 60 wt. % based on a weight of overall copolymerization component of the at least one acrylic resins (X1) and (X2),
      a proportion of the monomer (a2) is 15 to 90 wt. % based on a weight of overall copolymerization component of the at least one acrylic resins (X1) and (X2), and
      a proportion of the monomer (a3) is 5 to 60 wt. % based on a weight of overall copolymerization component of the at least one acrylic resins (X1) and (X2),
   wherein the acrylic resins (X1) and (X2) have different glass transition temperatures and each respectively has a weight average molecular weight of not less than 10,000,
   wherein the acrylic resin (X) has a glass transition temperature (Tx) of not higher than −20° C. as measured as a temperature at which a loss tangent of a dynamic viscoelasticity thereof is maximum, and
   wherein a temperature difference between a glass transition temperature (Tx1) of the acrylic resin (X1) and a glass transition temperature (Tx2) of the acrylic resin (X2) is not greater than 20° C., and
   wherein at least one of the following conditions is satisfied:
      (i) the glass transition temperature Tx is −25° C. to −10° C. as measured as a temperature at which a loss tangent of a dynamic viscoelasticity thereof is maximum, and
      (ii) the glass transition temperature Tx2 is −35° C. to −20° C. as measured as a temperature at which a loss tangent of a dynamic viscoelasticity thereof is maximum.

3. The adhesive composition according to claim 2, wherein the glass transition temperature $T_{X1}$ is −25° C. to −10° C. as measured as a temperature at which a loss tangent of a dynamic viscoelasticity thereof is maximum.

4. The adhesive composition according to claim 2, wherein the glass transition temperature $T_{X2}$ is −35° C. to −20° C. as measured as a temperature at which a loss tangent of a dynamic viscoelasticity thereof is maximum.

5. The adhesive composition according to claim 2, wherein the acrylic resin (X1) and the acrylic resin (X2) are present in a weight ratio X1/X2 of 70/30 to 30/70.

6. The adhesive composition according to claim 2, wherein the acrylic resin (X2) is an acrylic resin prepared by copolymerization using the hydroxyl-containing monomer (a1) including 2-hydroxyethyl (meth)acrylate and 4-hydroxybutyl (meth)acrylate as a copolymerization component.

7. The adhesive composition according to claim 2, further comprising a carbodiimide compound.

8. A solvent-free adhesive composition comprising the adhesive composition according to claim 2.

9. An adhesive agent comprising the adhesive composition according to claim 2.

10. An adhesive sheet comprising an adhesive layer, the adhesive layer comprising the adhesive composition according to claim 2.

11. An adhesive agent comprising the solvent-free adhesive composition according to claim 8.

12. An adhesive sheet comprising an adhesive layer, the adhesive layer comprising the solvent-free adhesive composition according to claim 8.

13. The adhesive sheet according to claim 10,
wherein the adhesive sheet has an adhesive strength (α) of not less than 25 N/25 mm, a bending durability (β) of not less than 100,000 times, and a moist heat haze resistance (γ) of not greater than 1.0% as determined in the following manner:
the adhesive strength (α) being defined as a 180-degree peel strength (N/25 mm) measured at a peel rate of 300 mm/minute by means of an autograph with the use of a sample prepared by forming the adhesive layer on an adhesion-facilitated polyethylene terephthalate sheet having a thickness of 125 μm to produce an adhesive sheet, reciprocally moving a 2-kg roller on the adhesive sheet to press-bond the adhesive layer of the adhesive sheet to an alkali-free glass plate in an environment at 23° C. at 50% RH, and allowing the resulting adhesive sheet to stand still in the environment at 23° C. at 50% RH for 30 minutes;
the bending durability (β) being defined as the number of times of bending during which no appearance change is observed when a repetitive bending test is performed, with the use of a test sample prepared by forming the adhesive layer on an adhesion-facilitated polyethylene terephthalate sheet having a thickness of 125 μm to produce an adhesive sheet and reciprocally moving a roller on the adhesive sheet to press-bond the adhesive layer of the adhesive sheet to a transparent polyimide film having a thickness of 50 μm in an environment at 23° C. at 50% RH, by repeatedly bending the test sample at a rate of 40 times/minute to a bent state with the polyethylene terephthalate sheet of the test sample located inward and with opposed sheet portions of the test sample spaced a distance of 5 mm in the environment at 23° C. at 50% RH; and
the moist heat haze resistance (γ) being defined as a difference between haze values measured before and after a moist heat test is performed in an environment at 60° C. at 90% RH for 168 hours with the use of a test piece prepared by forming the adhesive layer on an adhesion-facilitated polyethylene terephthalate sheet having a thickness of 125 μm to produce an adhesive sheet, bonding the adhesive sheet to an alkali-free glass plate having a thickness of 1.1 mm, and autoclaving the resulting adhesive sheet at 50° C. at 0.5 MPa for 20 minutes.

14. An adhesive layer formed by curing an adhesive composition [I] comprising an acrylic resin (X),
wherein a proportion of a hydroxyl-containing monomer (a1) in the acrylic resin (X) is 5 to 60 wt. % based on a weight of overall copolymerization component,
wherein a proportion of at least one copolymerizable monomer (a2) selected from the group consisting of a vinyl ester monomer and an alkyl (meth)acrylate monomer having a C5 to C14 alkyl group in the acrylic resin (X) is 15 to 90 wt. % based on a weight of overall copolymerization component,
wherein a proportion of at least one copolymerizable monomer (a3) selected from the group consisting of a vinyl ester monomer and an alkyl (meth)acrylate monomer having a C1 to C4 alkyl group in the acrylic resin (X) is 5 to 60 wt. % based on a weight of overall copolymerization component,
wherein the acrylic resin (X) comprises at least two acrylic resins having different glass transition temperatures and each respectively having a weight average molecular weight of not less than 10,000,
wherein the acrylic resin (X) has a glass transition temperature ($T_X$) of not higher than −20° C. as measured as a temperature at which a loss tangent of a dynamic viscoelasticity thereof is maximum, and
wherein a temperature difference between a glass transition temperature ($T_{X1}$) of a highest-glass transition temperature acrylic resin (X1) and a glass transition temperature ($T_{X2}$) of a lowest-glass transition temperature acrylic resin (X2) is not greater than 20° C., and
wherein at least one of the following conditions is satisfied:
(i) the glass transition temperature $T_{X1}$ is −25° C. to −10° C. as measured as a temperature at which a loss tangent of a dynamic viscoelasticity thereof is maximum, and
(ii) the glass transition temperature $T_{X2}$ is −35° C. to −20° C. as measured as a temperature at which a loss tangent of a dynamic viscoelasticity thereof is maximum,
and wherein a difference between the weight average molecular weight ($Mw_{X1}$) of the highest-glass transition temperature acrylic resin (X1) and the weight average molecular weight ($Mw_{X2}$) of the lowest-glass transition temperature acrylic resin (X2) satisfies the following expression:

$$(Mw_{X1})-(Mw_{X2}) \geq -100{,}000.$$

15. An adhesive composition [I] comprising an acrylic resin (X),
wherein a proportion of a hydroxyl-containing monomer (a1) in the acrylic resin (X) is 5 to 60 wt. % based on a weight of overall copolymerization component,
wherein a proportion of at least one copolymerizable monomer (a2) selected from the group consisting of a vinyl ester monomer and an alkyl (meth)acrylate monomer having a C5 to C14 alkyl group in the acrylic resin (X) is 15 to 90 wt. % based on a weight of overall copolymerization component,
wherein a proportion of at least one copolymerizable monomer (a3) selected from the group consisting of a vinyl ester monomer and an alkyl (meth)acrylate monomer having a C1 to C4 alkyl group in the acrylic resin (X) is 5 to 60 wt. % based on a weight of overall copolymerization component,
wherein the acrylic resin (X) comprises at least two acrylic resins having different glass transition temperatures and each respectively having a weight average molecular weight of not less than 10,000,
wherein the acrylic resin (X) has a glass transition temperature ($T_X$) of not higher than −20° C. as measured as a temperature at which the loss tangent of the dynamic viscoelasticity thereof is maximum, and
wherein a temperature difference between a glass transition temperature ($T_{X1}$) of a highest-glass transition temperature acrylic resin (X1) and a glass transition temperature ($T_{X2}$) of a lowest-glass transition temperature acrylic resin (X2) is not greater than 20° C., and
wherein at least one of the following conditions is satisfied:
(i) the glass transition temperature $T_{X1}$ is −25° C. to −10° C. as measured as a temperature at which a loss tangent of a dynamic viscoelasticity thereof is maximum, and (ii) the glass transition temperature $T_{X2}$ is $-35°$ C. to $-20°$ C. as measured as a temperature at which a loss tangent of a dynamic viscoelasticity thereof is maximum, and wherein a difference between the weight average molecular weight ($Mw_{X1}$) of the highest-glass transition temperature acrylic resin (X1) and the weight average molecular weight ($Mw_{X2}$) of the lowest-glass transition temperature acrylic resin (X2) satisfies the following expression:

$$(Mw_{X1})-(Mw_{X2}) \geq -100{,}000.$$

* * * * *